US012591313B2

(12) United States Patent
Evangelista et al.

(10) Patent No.: US 12,591,313 B2
(45) Date of Patent: Mar. 31, 2026

(54) WIDGET INTERACTION FOR EXTENDED REALITY (XR) APPLICATIONS

(71) Applicant: Samsung Electronics Co., Ltd., Suwon-si (KR)

(72) Inventors: Edgar Charles Evangelista, San Jose, CA (US); Hiroshi Horii, Pleasanton, CA (US); Ajinkya Waghulde, Castro Valley, CA (US); Yujie Jiang, Santa Clara, CA (US); Sooryuh Kim, Seoul (KR); Minkyung Cho, Seoul (KR); Boosun Shin, Seoul (KR); Sungman Kim, Seoul (KR); Chaekyung Lee, Gwacheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/746,306

(22) Filed: Jun. 18, 2024

(65) Prior Publication Data

US 2025/0004565 A1 Jan. 2, 2025

Related U.S. Application Data

(60) Provisional application No. 63/523,436, filed on Jun. 27, 2023.

(51) Int. Cl.
| | |
|---|---|
| *G06F 3/01* | (2006.01) |
| *G02B 27/01* | (2006.01) |
| *G06F 3/04815* | (2022.01) |
| *G06F 3/04842* | (2022.01) |
| *G06F 3/04845* | (2022.01) |

(Continued)

(52) U.S. Cl.
CPC ........... *G06F 3/017* (2013.01); *G02B 27/017* (2013.01); *G06F 3/013* (2013.01); *G06F 3/04815* (2013.01); *G06F 3/04842* (2013.01); *G06F 3/04845* (2013.01); *G06F 3/0485* (2013.01); *G06F 3/167* (2013.01); *G06T 19/006* (2013.01);

(Continued)

(58) Field of Classification Search
CPC ...... G06F 3/013; G06F 3/017; G06F 3/04815; G06F 3/0482; G06F 3/04845; G06F 3/0485; G06F 3/167; G02B 27/017; G02B 2027/0185; G06T 19/006
See application file for complete search history.

(56) References Cited

U.S. PATENT DOCUMENTS

| | | | |
|---|---|---|---|
| 9,959,679 B2 | 5/2018 | Terahata | |
| 10,203,762 B2 | 2/2019 | Bradski et al. | |

(Continued)

*Primary Examiner* — Priyank J Shah

(57) ABSTRACT

A method includes rendering a virtual widget at a first position in an extended reality (XR) space using a head-mounted display. The method also includes detecting a hand gesture of a user at a second position in the XR space using at least one optical sensor. The second position is between the first position and the optical sensor. The method further includes determining a duration of the hand gesture and a distance between the first and second positions. The method also includes performing a first or second type of action based on the duration and/or the distance. The first type of action corresponds to a system-level control of the virtual widget, and the second type of action corresponds to a content-level control of the virtual widget. In addition, the method includes rendering a visual and/or audio feedback based on at least one of the duration or the distance.

20 Claims, 20 Drawing Sheets

(51) Int. Cl.

| | |
|---|---|
| *G06F 3/0485* | (2022.01) |
| *G06F 3/16* | (2006.01) |
| *G06T 19/00* | (2011.01) |
| *G06V 40/20* | (2022.01) |

(52) U.S. Cl.

CPC ...... *G06V 40/28* (2022.01); *G02B 2027/0138* (2013.01)

(56) References Cited

U.S. PATENT DOCUMENTS

| | | | |
|---|---|---|---|
| 10,394,437 B2 | 8/2019 | Jambou | |
| 10,754,417 B2 | 8/2020 | Harvey et al. | |
| 10,802,600 B1 | 10/2020 | Ravasz et al. | |
| 11,055,925 B1 | 7/2021 | Bhushan et al. | |
| 11,320,957 B2 | 5/2022 | Tang et al. | |
| 11,334,212 B2 | 5/2022 | Ravasz et al. | |
| 11,693,482 B2 | 7/2023 | Hosseinkhani Loorak et al. | |
| 11,726,578 B1 | 8/2023 | Fashimpaur et al. | |
| 11,756,280 B2 | 9/2023 | Fieldman | |
| 2017/0083088 A1* | 3/2017 | Lannsjö | G06F 3/0485 |
| 2018/0095636 A1 | 4/2018 | Valdivia et al. | |
| 2018/0239144 A1 | 8/2018 | Woods et al. | |
| 2018/0339223 A1* | 11/2018 | Haas | A63F 13/211 |
| 2019/0011981 A1 | 1/2019 | Noguchi | |
| 2019/0079599 A1* | 3/2019 | Lee | G06F 3/0346 |
| 2019/0313059 A1 | 10/2019 | Agarawala et al. | |
| 2019/0339837 A1 | 11/2019 | Furtwangler | |
| 2020/0026352 A1* | 1/2020 | Wang | G06T 19/006 |
| 2021/0286427 A1 | 9/2021 | Pateriya | |
| 2021/0312716 A1 | 10/2021 | Xie et al. | |
| 2023/0117197 A1 | 4/2023 | Stolzenberg | |
| 2023/0195236 A1* | 6/2023 | Sun | G06F 3/017 |
| | | | 345/157 |
| 2023/0244302 A1 | 8/2023 | Kuwatani et al. | |
| 2024/0104877 A1* | 3/2024 | Henderson | G06F 3/0482 |
| 2024/0126376 A1* | 4/2024 | Tseng | G06F 3/013 |

* cited by examiner dC in DMM = dC / dU

FIGURE 5A                    FIGURE 5B

[Near distance] Touch / Push / Pinch + Release
[Far distance] Pinch + Release

[Near distance] Pinch or Poke scroll buttons
[Far distance] Pinch scroll buttons

705

705

1101

1102

1103

1201

1202

1203

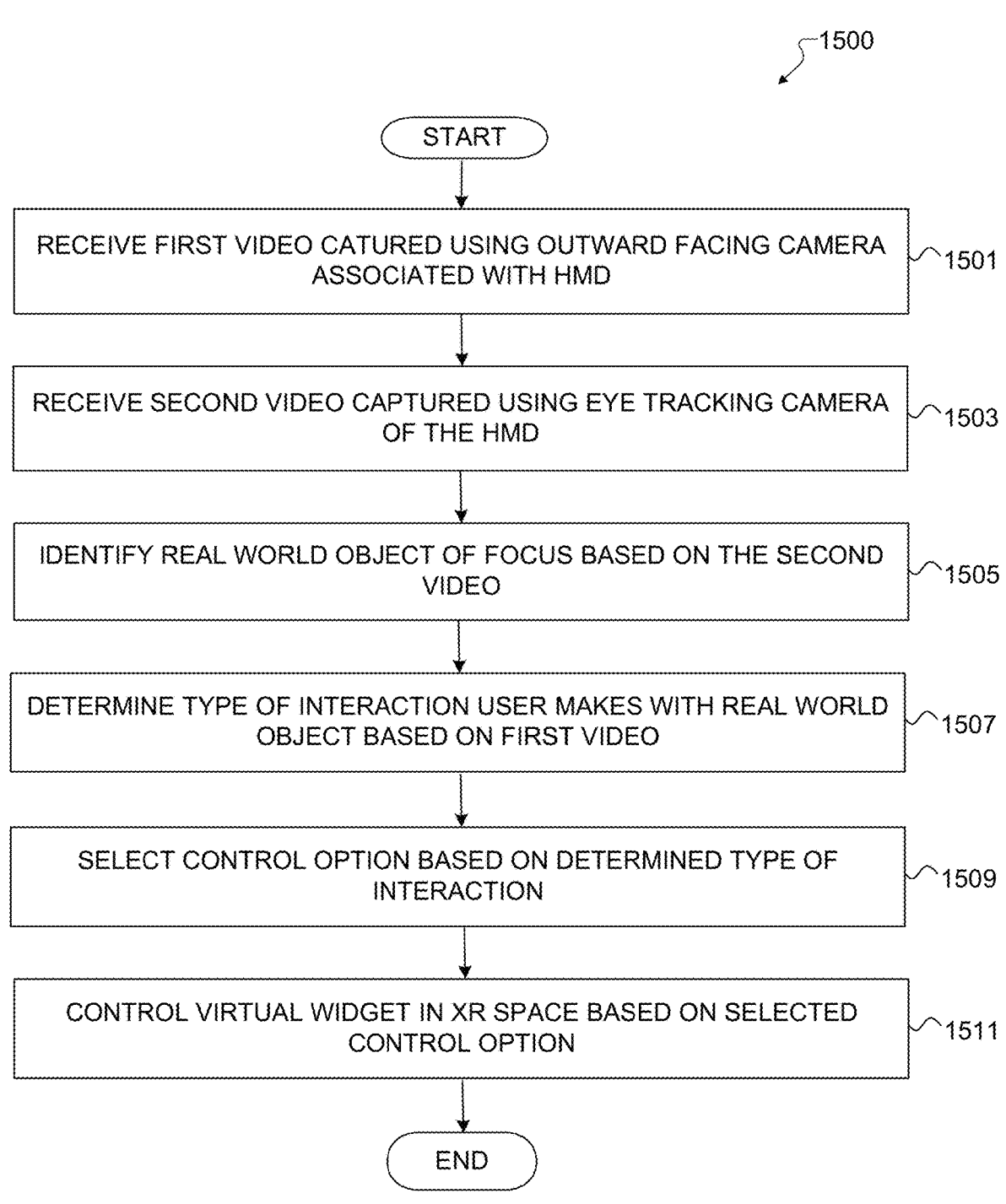

1500

START

RECEIVE FIRST VIDEO CATURED USING OUTWARD FACING CAMERA ASSOCIATED WITH HMD ~1501

RECEIVE SECOND VIDEO CAPTURED USING EYE TRACKING CAMERA OF THE HMD ~1503

IDENTIFY REAL WORLD OBJECT OF FOCUS BASED ON THE SECOND VIDEO ~1505

DETERMINE TYPE OF INTERACTION USER MAKES WITH REAL WORLD OBJECT BASED ON FIRST VIDEO ~1507

SELECT CONTROL OPTION BASED ON DETERMINED TYPE OF INTERACTION ~1509

CONTROL VIRTUAL WIDGET IN XR SPACE BASED ON SELECTED CONTROL OPTION ~1511

END

FIGURE 15

WIDGET INTERACTION FOR EXTENDED REALITY (XR) APPLICATIONS

CROSS-REFERENCE TO RELATED APPLICATIONS AND PRIORITY CLAIM

This application claims priority under 35 U.S.C. § 119 (e) to U.S. Provisional Patent Application No. 63/523,436 filed on Jun. 27, 2023, which is hereby incorporated by reference in its entirety.

TECHNICAL FIELD

This disclosure relates generally to extended reality (XR) systems and processes. More specifically, this disclosure relates to widget interaction for XR applications.

BACKGROUND

Extended reality (XR) is an umbrella term encompassing augmented reality (AR), virtual reality (VR), and mixed reality (MR). In the domain of XR, the user's experience is significantly enriched by the user's ability to interact with and manipulate virtual objects or software components, often referred to as "widgets." These widgets, such as virtual buttons, sliders, or other control elements, form one method for user interaction within the XR environment.

SUMMARY

This disclosure relates to widget interaction for extended reality (XR) applications.

In a first embodiment, a method includes rendering a virtual widget at a first position in an XR space using a head-mounted display (HMD). The method also includes detecting a hand gesture of a user at a second position in the XR space using at least one optical sensor of the HMD, where the second position is between the first position and the at least one optical sensor. The method further includes determining a duration of the hand gesture and a distance between the first position and the second position. The method also includes performing a first type of action or a second type of action based on at least one of the duration or the distance, where the first type of action corresponds to a system-level control of the virtual widget and the second type of action corresponds to a content-level control of the virtual widget. In addition, the method includes rendering at least one of a visual feedback or an audio feedback based on at least one of the duration or the distance. In another embodiment, a non-transitory machine readable medium contains instructions that when executed cause at least one processor to perform the method of the first embodiment.

In a second embodiment, an electronic device includes an HMD configured to render a virtual widget at a first position in an XR space. The electronic device also includes at least one processing device configured to receive a hand gesture of a user at a second position in the XR space detected using at least one optical sensor of the HMD, where the second position is between the first position and the at least one optical sensor. The at least one processing device is also configured to determine a duration of the hand gesture and a distance between the first position and the second position. The at least one processing device is further configured to perform a first type of action or a second type of action based on at least one of the duration or the distance, where the first type of action corresponds to a system-level control of the virtual widget and the second type of action corresponds to a content-level control of the virtual widget. In addition, the at least one processing device is configured to render at least one of a visual feedback or an audio feedback based on at least one of the duration or the distance.

In a third embodiment, a method includes receiving a first video captured using an outward facing camera associated with an HMD worn by a user, where the first video captures a user environment. The method also includes receiving a second video captured using an eye tracking camera associated with the HMD. The method further includes identifying a real world object on which eyes of the user are focused based on the second video, where the real world object is associated with a set of control options. The method also includes determining a type of interaction the user makes with the real world object based on the first video, where the type of interaction includes one of a contact interaction, a rotation interaction, or a shift interaction. The method further includes selecting a control option among the set of control options based on the determined type of interaction. In addition, the method includes controlling a virtual widget in an XR space based on the selected control option. In another embodiment, an electronic device includes at least one processing device configured to perform the method of the third embodiment. In yet another embodiment, a non-transitory machine readable medium contains instructions that when executed cause at least one processor to perform the method of the third embodiment.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a dryer, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOME-POD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112 (f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112 (f).

BRIEF DESCRIPTION OF THE DRAWINGS

For a more complete understanding of this disclosure and its advantages, reference is now made to the following description taken in conjunction with the accompanying drawings, in which like reference numerals represent like parts:

FIGS. 5A through 5C illustrate examples of widget content controls according to this disclosure;

FIG. 15 illustrates an example method for controlling a widget using a real world object according to this disclosure.

DETAILED DESCRIPTION

Figure 1:
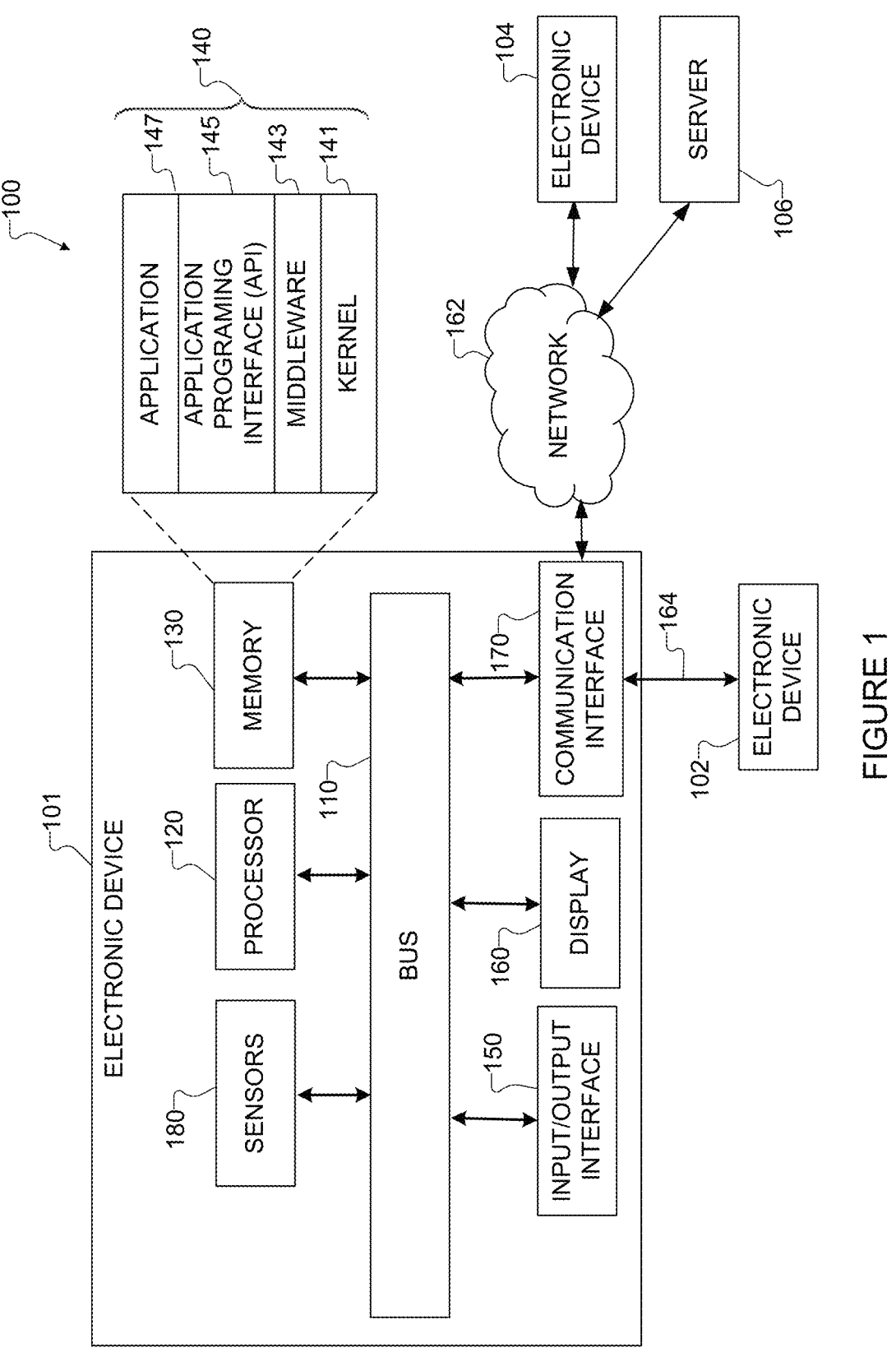
FIG. 1 illustrates an example network configuration including an electronic device according to this disclosure.
Figure 2A:
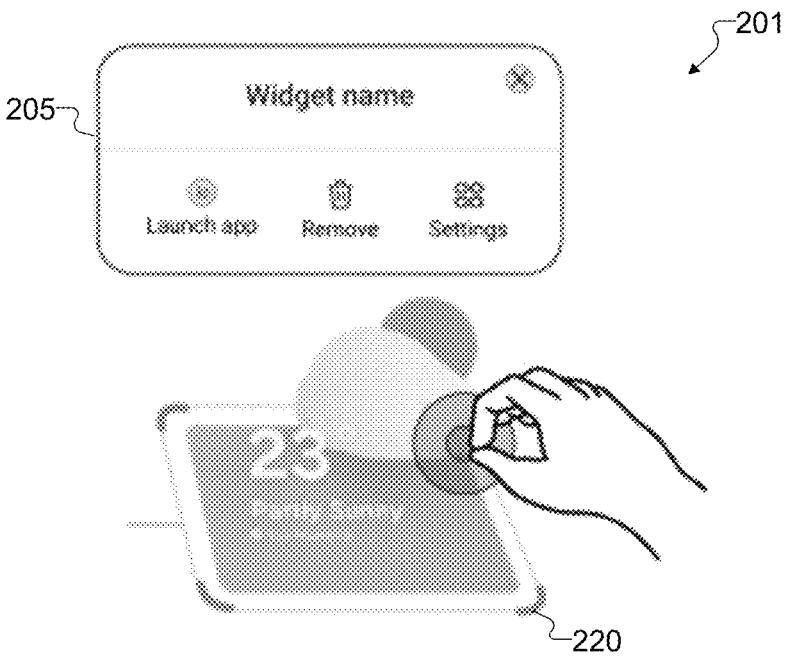
FIGS. 2A through 2D illustrate examples of widget system controls according to this disclosure.
Figure 2B:
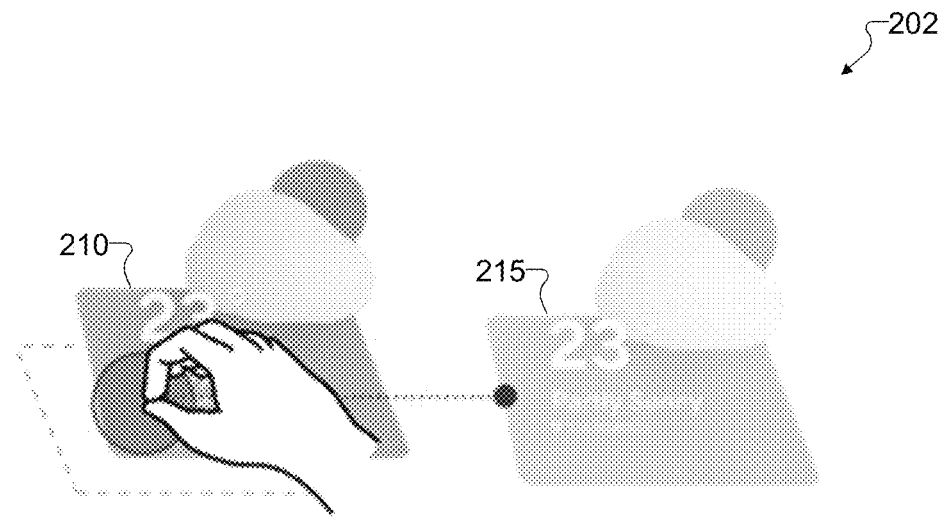
Figure 2C:
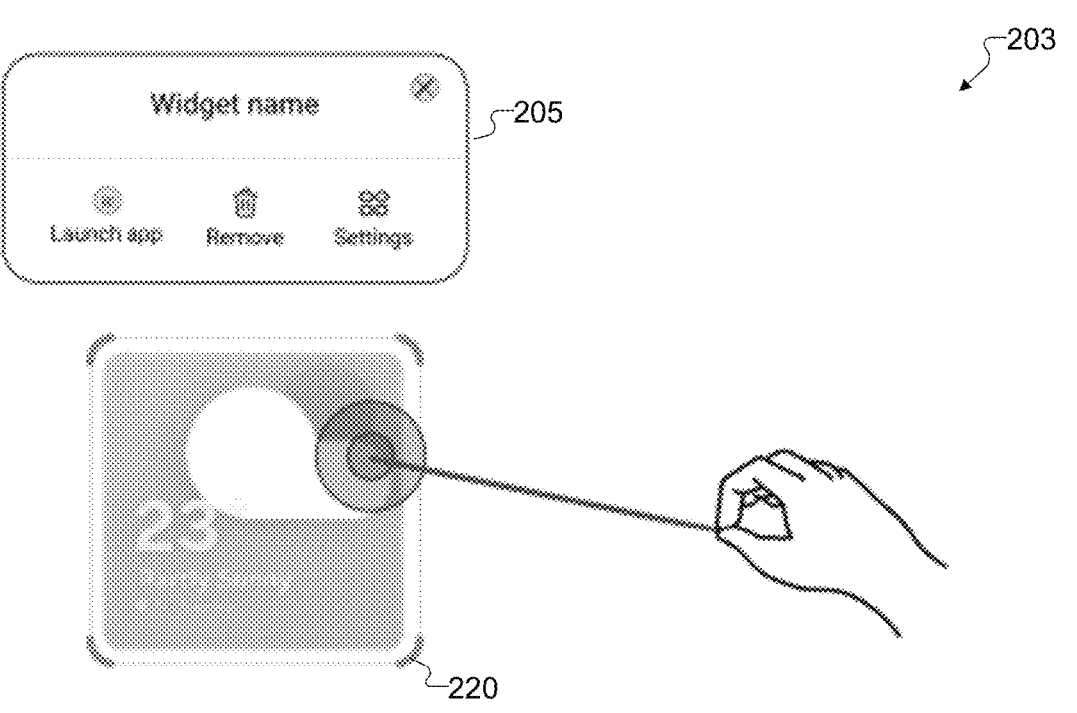
Figure 2D:
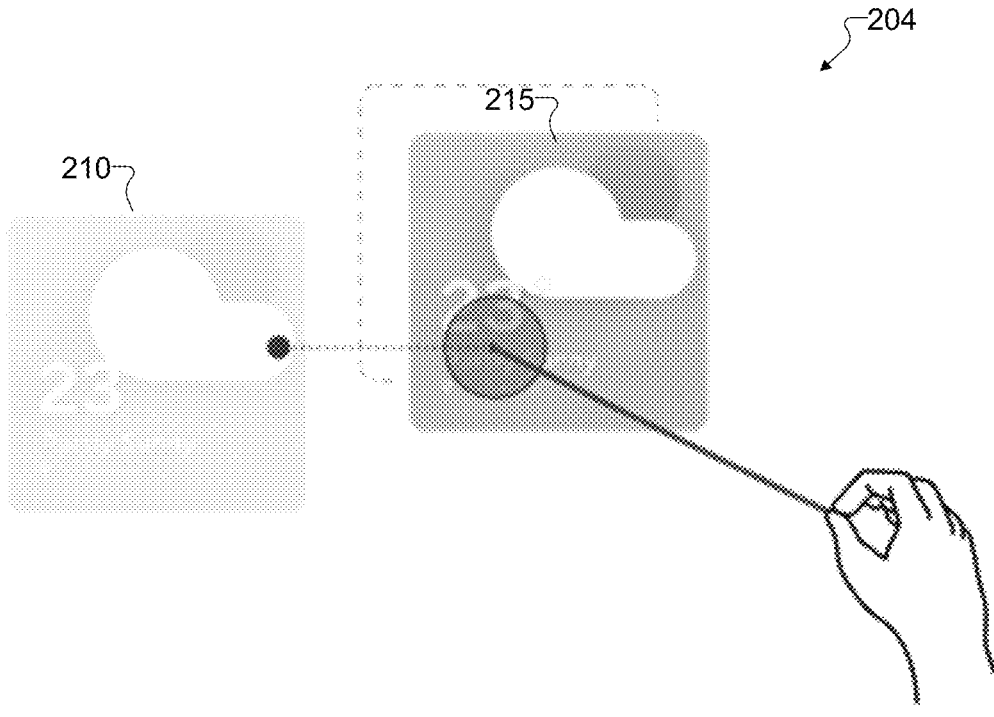

FIGS. 1 through 15, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, extended reality (XR) is an umbrella term encompassing augmented reality (AR), virtual reality (VR), and mixed reality (MR). In the domain of XR, the user's experience is significantly enriched by the user's ability to interact with and manipulate virtual objects or software components, often referred to as "widgets." These widgets, such as virtual buttons, sliders, or other control elements, form one method for user interaction within the XR environment.

Current methods for interacting with widgets in XR spaces do exist. However, they often have limitations that can negatively impact the user experience. These limitations can include lack of intuitiveness, difficulty in manipulation due to 3D spatial complexities, or the requirement of additional hardware accessories. Typically, interaction with widgets in an XR environment relies heavily on the use of handheld controllers or gesture recognition systems. While these methods have proven somewhat effective, they often require substantial user coordination and can result in inaccuracies due to sensor limitations or environmental interference. Also, the need for additional hardware can make the interaction process cumbersome and limit the widespread adoption of XR technologies. Moreover, many of the existing methods do not take full advantage of the immersive and three-dimensional nature of XR. For example, these methods often rely on two-dimensional interaction paradigms transposed into the XR space, leading to a less immersive and potentially frustrating user experience. Additionally, the interaction mechanisms provided by many current systems can often be overwhelming or confusing for users, particularly for those new to the XR space. The steep learning curve associated with these systems can deter novice users and limit the overall effectiveness of the XR applications.

This disclosure provides various techniques for widget interaction for XR applications. As described in more detail below, the disclosed embodiments provide more intuitive, user-friendly, and hardware-independent techniques of interacting with widgets in XR space. Among other things, the disclosed embodiments leverage the immersive and three-dimensional nature of XR and provide a more natural and intuitive user interface. This enhances the user experience, reduces the learning curve associated with XR applications, and may potentially foster greater adoption of XR technologies. Note that while some of the embodiments discussed below are described in the context of use in consumer electronic devices (such as head mounted displays), this is merely one example. It will be understood that the principles of this disclosure may be implemented in any number of other suitable contexts and may use any suitable devices.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), a graphics processor unit (GPU), or a neural processing unit (NPU). The processor 120 is able to perform control on at least one of the other components of the electronic device 101 and/or perform an operation or data processing relating to communication or other functions. As described in more detail below, the processor 120 may perform one or more operations for widget interaction for XR applications.

The memory 130 can include a volatile and/or nonvolatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for widget interaction for XR applications as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106).

For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an AR wearable device, such as a headset with a display panel or smart eyeglasses. In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for widget interaction for XR applications.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Embodiments of this disclosure provide multiple techniques for interaction with XR widgets. The disclosed interaction techniques include interactions with both widget system controls and widget content controls. Widget system controls relate to a widget as a whole and pertain to all types of widgets. Widget content controls relate to internal content of a particular widget. Interactions with both types of controls are described in greater detail below. In the following description, it is assumed that an XR user can use hand gestures (such as a pinch gesture, a poke gesture, a pinch-and-drag gesture, a pinch-and-hold gesture, or a hover gesture) or controller operations (such as with a game controller) as forms of input. However, other forms of input are possible and within the scope of this disclosure.

Widget System Controls

In order for a user to manage widgets, the user may be able to perform certain actions that all widgets support. These can be referred to as widget system controls. Widget system controls are interactions associated with system-level widget manipulations. Some examples of widget system controls include invoking a widget menu, moving or placing a widget at a location, and invoking resizing handles for resizing a widget.

FIGS. 2A through 2D illustrate examples of widget system controls 201-204 according to this disclosure. For ease of explanation, the widget system controls 201-204 are described as being implemented using one or more components of the network configuration 100 of FIG. 1 described above, such as the electronic device 101. However, this is merely one example, and the widget system controls 201-204 could be implemented using any other suitable device(s) (such as the server 106) and in any other suitable system(s).

As shown in FIGS. 2A through 2D, the widget system controls 201 and 202 show interaction with a widget that has been placed or projected on a horizontal surface, while the widget system controls 203 and 204 show interaction with a widget that has been placed or projected on a vertical surface. In one aspect of the widget system controls 201 and 203, the user invokes a widget menu 205. In some embodiments, the widget menu 205 does not appear unless the user elects to have it appear. Once the widget menu 205 appears, there may be a preset amount of time before the widget menu 205 disappears. If the user interacts with a button on the widget menu 205, this action may also cause the widget menu 205 to disappear. Some operations that the user can perform on the widget menu 205 could include:

Launch the widget's respective application (or "app") in XR space so that the user can access the app's full capabilities, which may not be present in the widget.

Remove the widget from the space.

Bring up a "settings" panel that allows the user to customize certain aspects that the widget displays and can control.

In some embodiments, the widget system controls 201-204 also allow the user to be able to move the widget within the XR space, resize the widget, or both. For example, in the widget system controls 202 and 204, the user performs a drag or click-and-drag widget movement from one location 210 to another location 215. In the widget system controls 201 and 203, the user performs a widget resizing operation as indicated by resizing handles 220 in the corners of the widgets. These interactions may all be possible without restricting the user from accessing the widget's content.

Although FIGS. 2A through 2D illustrate examples of widget system controls 201-204 and related details, various changes may be made to FIGS. 2A through 2D. For example, while the widget system controls 201-204 are described as involving specific sequences of operations, various operations described with respect to FIGS. 2A through 2D could overlap, occur in parallel, occur in a different order, or occur any number of times (including zero times). Also, the specific operations shown in FIGS. 2A through 2D are examples only, and other techniques could be used to perform each of the operations shown in FIGS. 2A through 2D.

Figure 3A:
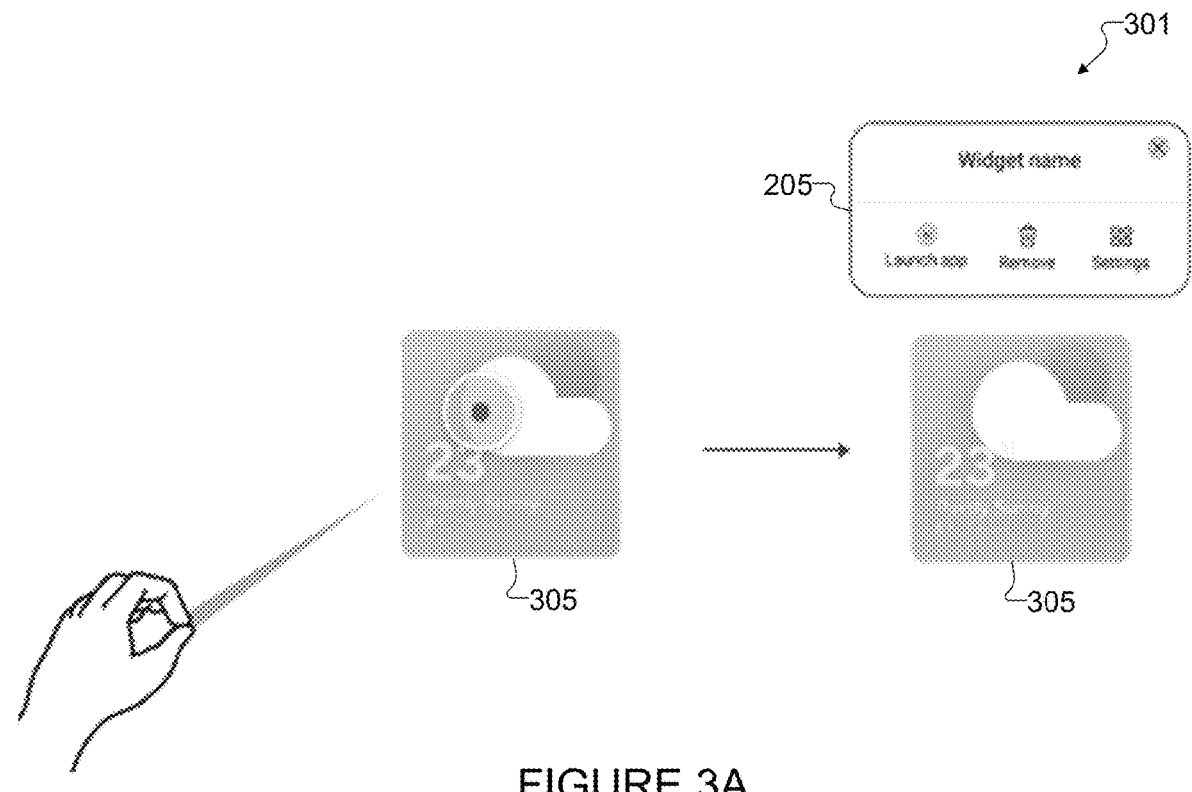
FIGS. 3A through 3C illustrate examples of additional widget system controls according to this disclosure.
Figure 3B:
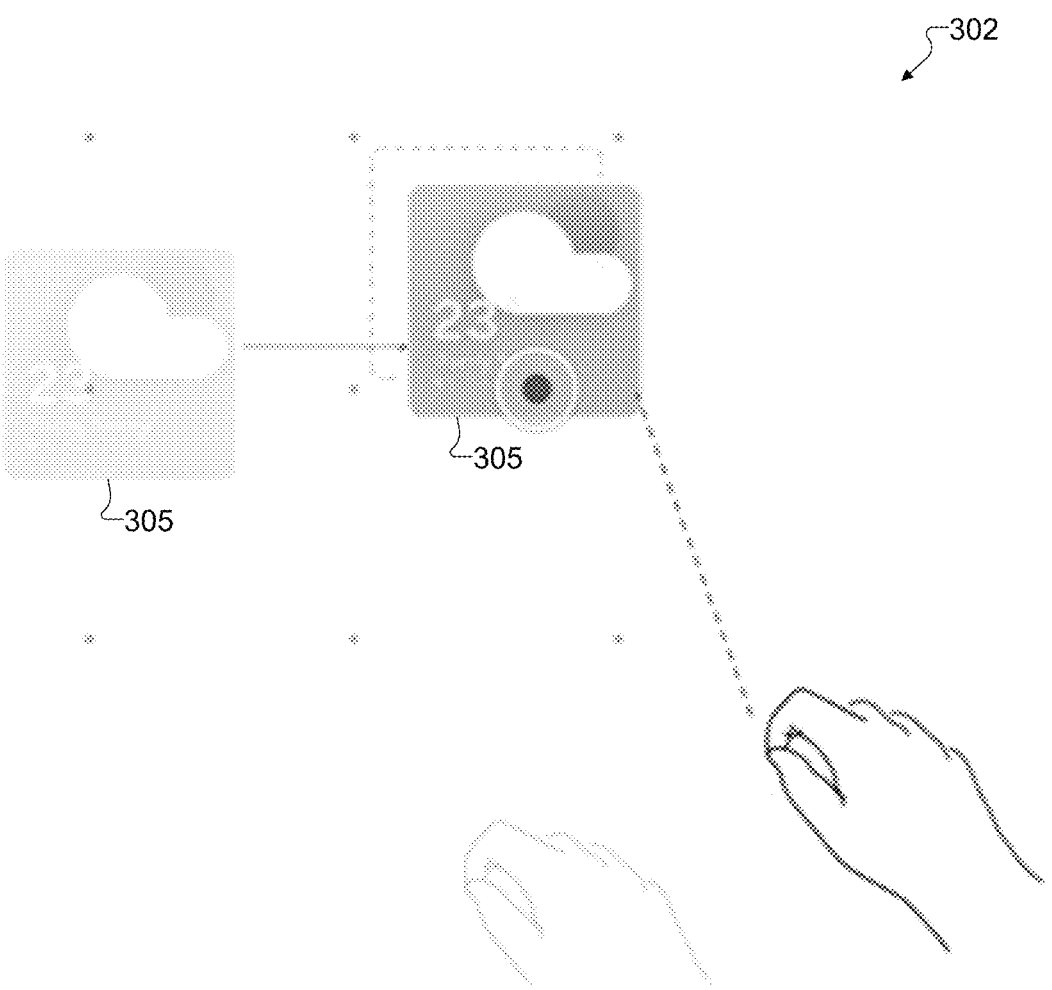
Figure 3C:
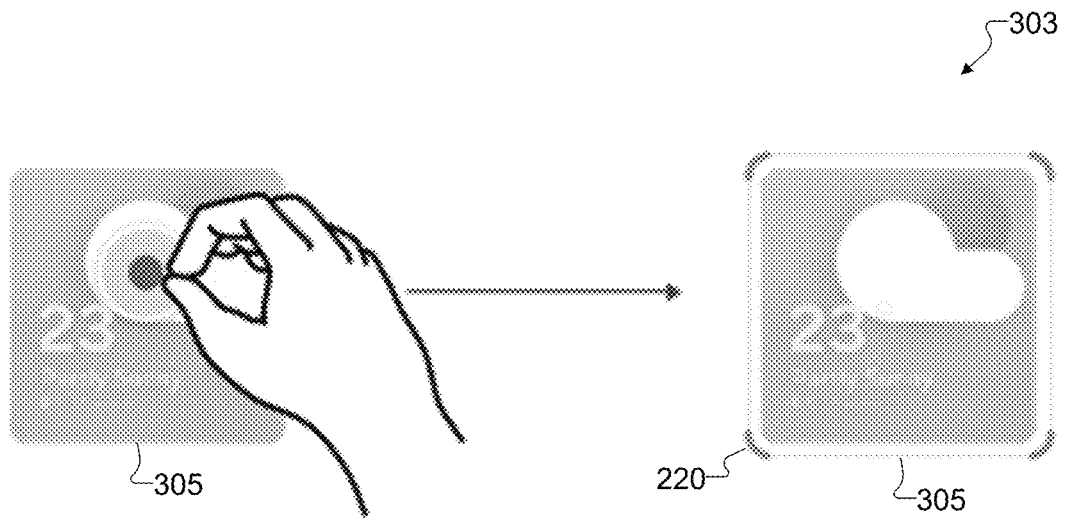

FIGS. 3A through 3C illustrate examples of additional widget system controls 301-303 according to this disclosure. For ease of explanation, the widget system controls 301-303 are described as being implemented using one or more components of the network configuration 100 of FIG. 1 described above, such as the electronic device 101. However, this is merely one example, and the widget system controls 301-303 could be implemented using any other suitable device(s) (such as the server 106) and in any other suitable system(s).

As shown in FIGS. 3A through 3C, the widget system controls 301-303 represent some of the operations shown in the widget system controls 201-204 of FIGS. 2A through 2D. On the whole widget panel surface, most content allows the user to access widget system controls. For example, in the widget system control 301 of FIG. 3A, a widget 305 is rendered in XR space. The user can pinch and hold for at least a predetermined duration (such as greater than 0.7 seconds) while the cursor stays within a certain space on the widget 305, such as within approximately 20 distance independent millimeters (DMM). DMM is an angular unit that represents one millimeter at a distance of one meter from the user's point of view. This invokes the widget menu 205 to appear a set space above the widget 305. As discussed above, the widget menu 205 can display certain buttons (such as launch app, remove, settings, and the like). The widget menu 205 can also display the name of the widget 305 and a close button for the widget menu 205. These buttons can be pinched to perform an action and close the widget menu 205.

In the widget system control 302 of FIG. 3B, if the user's cursor is dragged beyond the predetermined DMM within the predetermined period of time, the widget 305 is dragged (moved) to a new location. In the widget system control 303 of FIG. 3C, if the user pinches and holds for at least a predetermined duration (such as greater than 0.7 seconds), the resizing handles 220 are invoked on the widget 305 in order to resize the widget 305. In some embodiments, if the user's pinch gets released before the end of the predetermined duration, the cursor input goes on the initial content hit target invoking a widget content level action, which is described in greater detail below.

Certain content hit targets can be marked to disable widget system level hits that may require long presses and/or drags, such as scroll buttons. This prevents misfires invoking the widget menu and widget movement when the user desires to perform a widget content action. While the user actions described in FIGS. 2A through 3C involve user hand gestures, it is noted that the user can use a controller to aim the cursor and use the trigger button of the controller to perform actions similar to how pinches are used.

Figure 4:
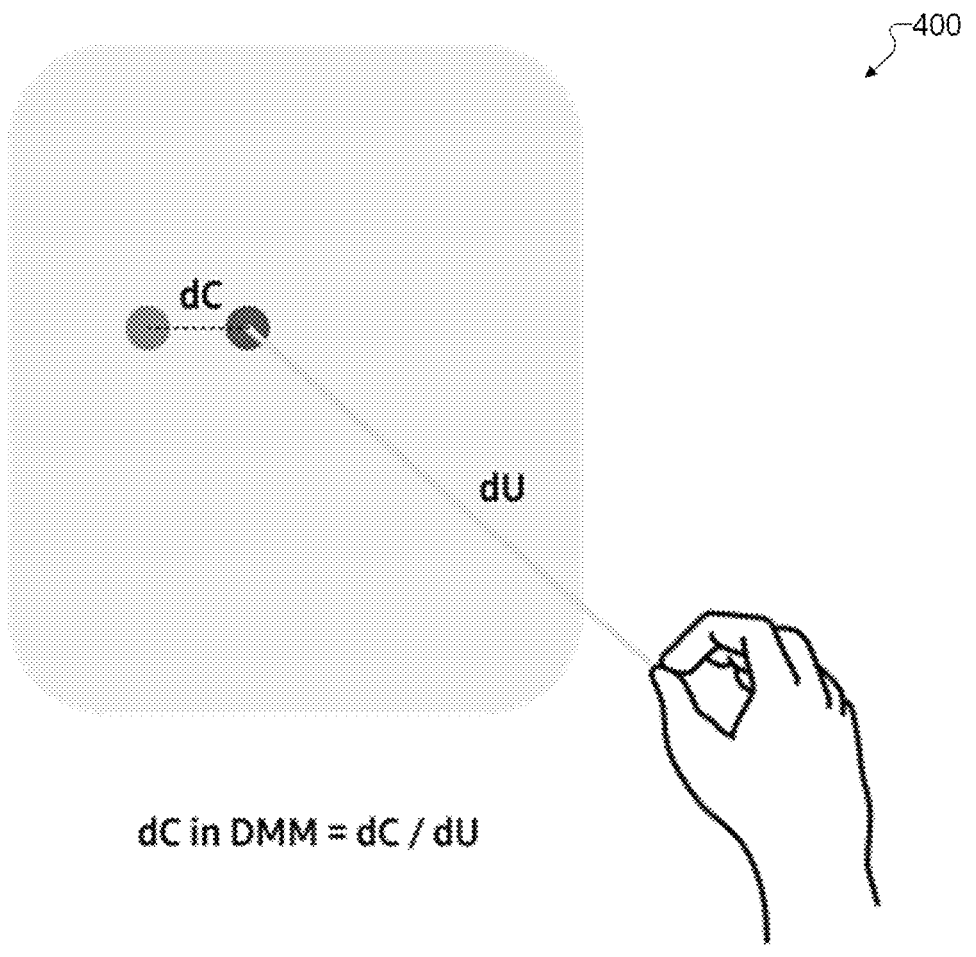
FIG. 4 illustrates an example technique for calculating distance independent millimeters (DMM) according to this disclosure.

FIG. 4 illustrates an example technique 400 for calculating DMM according to this disclosure. As shown in FIG. 4, in order to determine whether the user intends to drag or invoke the widget menu, the electronic device 101 can track the movement of the user's cursor. However, the cursor's movement distance is relative to the distance from the user's head and to the angle that the cursor moves with respect to the user's view space. In other words, when a user's hand moves, the cursor moves more if the user is further away. If the user is closer, the cursor moves less. The electronic device 101 can calculate the distance by recording the cursor position when the user first pinches. As the cursor moves, the electronic device 101 calculates the distance of its current position from its initial pinch position, which is indicated as dC in FIG. 4. The electronic device 101 can calculate the DMM distance by dividing the cursor movement distance dC by the distance from the user's view position to the cursor position, indicated as dU. Thus, dC in DMM=dC/dU.

Although FIGS. 3A through 4 illustrate examples of additional widget system controls 301-303 and related details, various changes may be made to FIGS. 3A through 4. For example, while the widget system controls 301-303 are described as involving specific sequences of operations, various operations described with respect to FIGS. 3A through 4 could overlap, occur in parallel, occur in a different order, or occur any number of times (including zero times). Also, the specific operations shown in FIGS. 3A through 4 are examples only, and other techniques could be used to perform each of the operations shown in FIGS. 3A through 4.

Widget Content Controls

Widget content controls allow a user to interact with or otherwise manipulate widget content. In some embodiments, the manipulation can include the user pinching widget components or buttons to interact with the widget content.

Figure 5C:
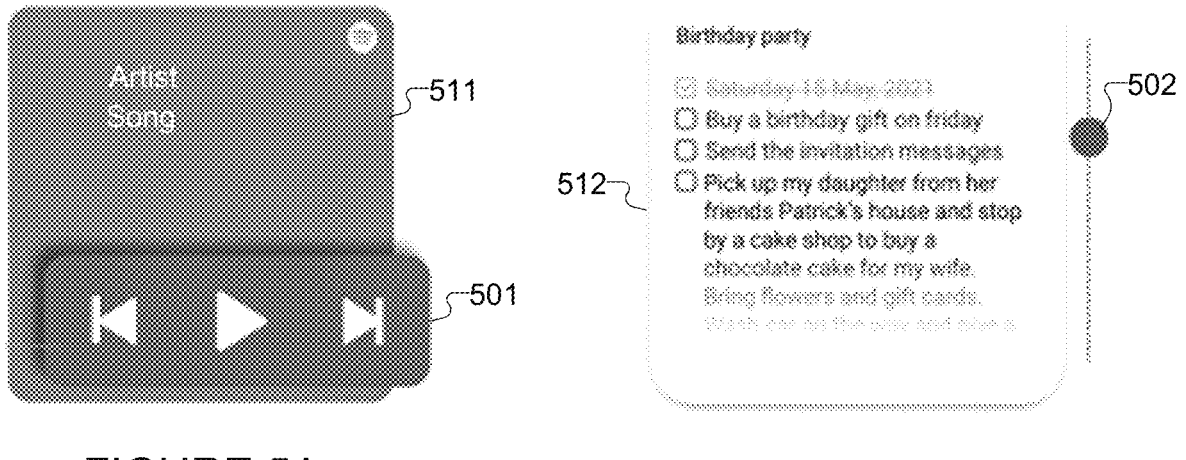
Figure 5C:
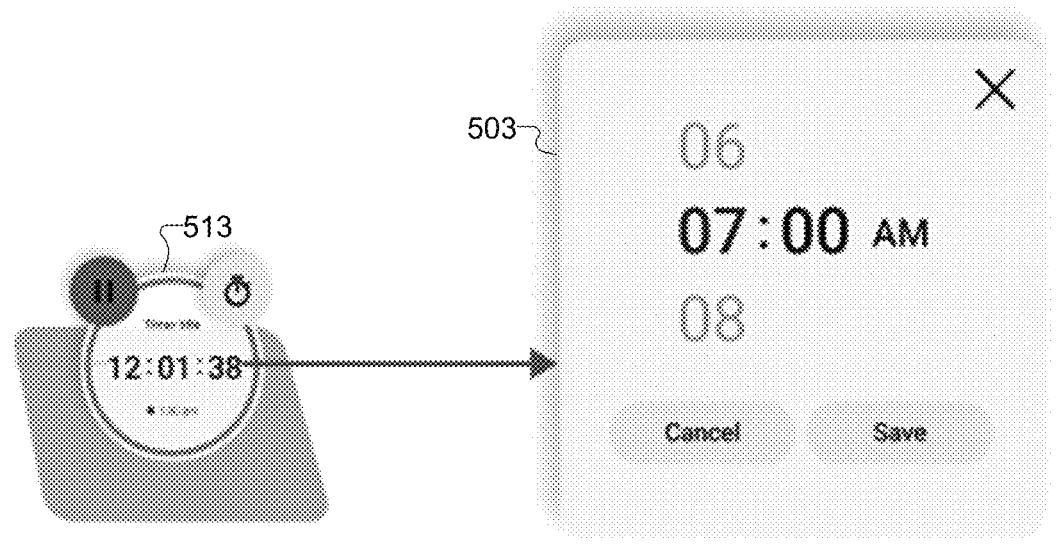

FIGS. 5A through 5C illustrate examples of widget content controls 501-503 according to this disclosure. For ease of explanation, the widget content controls 501-503 are described as being implemented using one or more components of the network configuration 100 of FIG. 1 described above, such as the electronic device 101. However, this is merely one example, and the widget content controls 501-503 could be implemented using any other suitable device(s) (such as the server 106) and in any other suitable system(s).

As shown in FIGS. 5A through 5C, the widget content controls 501-503 can include a widget content control 501 for playing music in a music player widget 511, a widget content control 502 for scrolling or editing text in a note widget 512, and a widget content control 503 for setting an alarm in a clock widget 513. There are as many possibilities of interactions for widgets as there are possible widgets since many applications can have widgets for quick access to their tools or data. Some representative examples of widget interactions include selecting a button on the widget, navigating or scrolling content on the widget, or invoking widget expansion for additional interactions with the widget. In some cases, the inputs for widget content can be grouped into two types of inputs: (i) input that allows for system level invocation, and (ii) input that ignores system level input. These are now described in greater detail.

Figure 6A:
FIGS. 6A and 6B illustrate examples of inputs for widget content according to this disclosure.
Figure 6A:
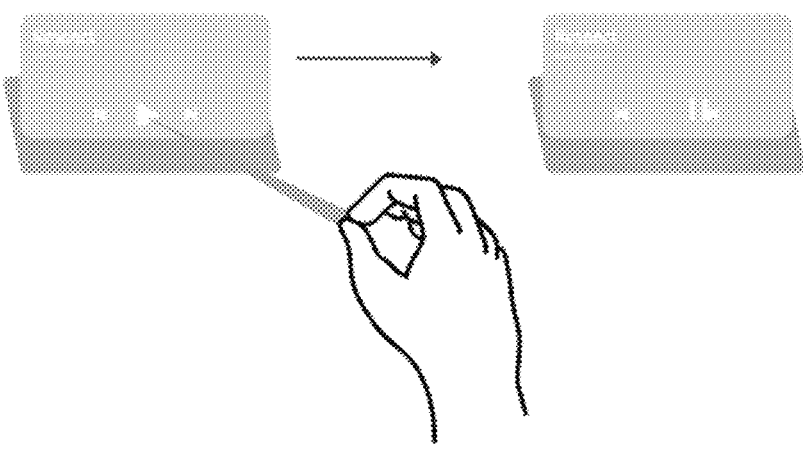
Figure 6B:
Figure 6B:
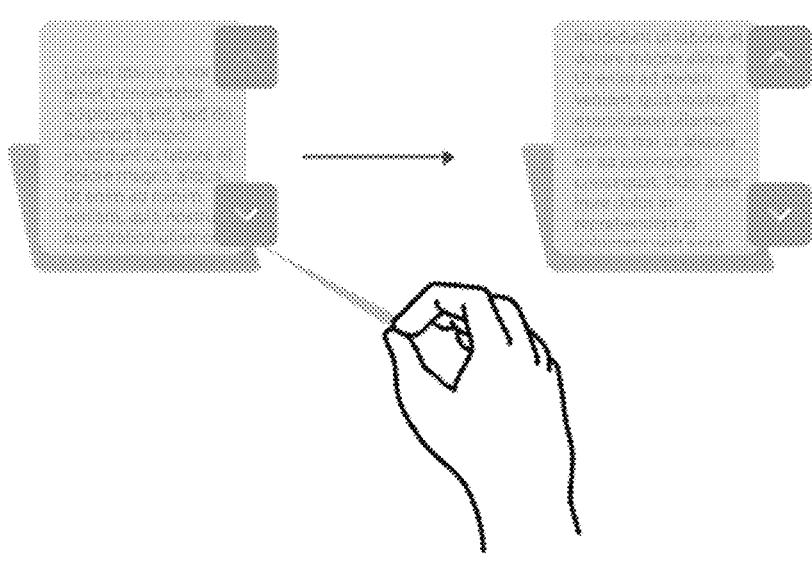

FIGS. 6A and 6B illustrate examples of inputs 601 and 602 for widget content according to this disclosure. For ease of explanation, the inputs 601 and 602 are described as being implemented using one or more components of the network configuration 100 of FIG. 1 described above, such as the electronic device 101. However, this is merely one example, and the inputs 601 and 602 could be implemented using any other suitable device(s) (such as the server 106) and in any other suitable system(s).

As shown in FIGS. 6A and 6B, the inputs 601 and 602 can include an input 601 for selecting a button and an input 602 for navigating content. The input 601 for selecting a button is an example of an input that allows for system level invocation. In general, buttons are often a primary form for widget interaction, since many widgets are designed for simple interactions. In some embodiments, buttons may only allow for pushes and pinches that last for less than a predetermined time period (such as 0.8 seconds) so that the push or pinch will not be confused with any long input necessary for widget systems. Also, buttons typically do not allow for a drag motion, so this type of input may not be confused with widget movement interaction.

In some embodiments, the actions that can be performed on a button depend on the distance of the user from the widget. As an example, buttons can be touched, pushed, and pinched at a near distance, and buttons can only be pinched and released when the cursor is on the button at a far distance. Similar to hand gestures, controllers may also be used to aim the cursor towards the button, and the trigger button can be pressed and released similar to a pinch.

The input 602 for navigating content is an example of an input that ignores system level input. In some embodiments, certain non-button widget user interface components require long presses or drags, such as scroll bar components. Because long presses are utilized to bring up the widget menu and dragging is used to move the widget, detecting these gestures could conflict with normal scroll usage. Scroll bars can require a pinch and drag to move page content, while scroll buttons may be held for long periods (such as greater than 0.8 seconds) to also scroll to the right page content.

In some embodiments, the input 602 for navigating content can involve four-way interactions in space: horizontal, vertical, depth, and diagonal. The input mechanism can also apply to other interactions such as swiping, pinch/press buttons, zoom, rotate, drag, double-hand gestures, and the like. Also, in some embodiments, the scrollable content is controlled by the distance from the user's hands to the buttons. The distance can control either velocity of the scroll or the amount of content to be revealed, such as when larger distances result in more content being revealed. Further, in some embodiments (such as during scroll interactions), the velocity of the pull gesture determines the pressure exerted on the virtual spring and thus controls the speed of scrolling. As a result, scroll bar components, as well as other components that require a long pinch or drag, can ignore system level input and consume any long pinch or drag signals to operate properly. The user may not expect the widget menu nor widget movement when the user interacts with these components.

Controllers may also perform similar actions as a pinch by control of the cursor and use of the trigger button. For example, during certain interactions like scrolling, a user can use a joystick by pointing at the scrollable content and moving the joystick in the direction the user wishes to scroll.

Widget Expansion

For some widgets and applications, one small widget panel may not be enough to provide all capabilities that the user may require, but opening the application may require too many steps and may be too cumbersome for a user. Expanded widgets represent a middle ground that allows users to receive the right amount of information or capability without requiring too many steps. In order to expand a widget, a user can pinch on an area not covered by content on the widget panel area. In some embodiments, the pinch should be a short pinch and should not drag, similar to that for widget buttons. The pinch can invoke an expanded widget panel that appears above the widget. Since the expanded widget does not need to invoke widget system controls, it can receive all types of interaction. The expanded widget can have a close button that allows the user to hide the expanded widget when not in use. In some embodiments, since the expanded widget does take up more of the user's view, there can be a limit for how many expanded widget panels can appear at the same time. Similar to pinching, a controller may be used to aim the cursor and pinch on the same target area to expand the widget. For expanded widget content, the user can use controller buttons to interact with content freely, use a trigger button joypad, or use any other typical button interaction.

Although FIGS. 5A through 6B illustrate examples of widget content controls 501-503 and related details, various changes may be made to FIGS. 5A through 6B. For example, while the widget system controls 501-503 are described as involving specific sequences of operations, various operations described with respect to FIGS. 5A through 6B could overlap, occur in parallel, occur in a different order, or occur any number of times (including zero times). Also, the specific operations shown in FIGS. 5A through 6B are examples only, and other techniques could be used to perform each of the operations shown in FIGS. 5A through 6B.

Real World Objects as Input for Widgets

In addition to using hand gestures and controllers, users may elect to use external cameras of their headsets to map one or more real-world, physical objects as digital inputs when utilized in simple actions. After mapping a physical object, the cameras can detect simple changes in the placement of the physical object to drive one or more digital objects and provide tactile feedback to a user's interactions.

Figure 7:
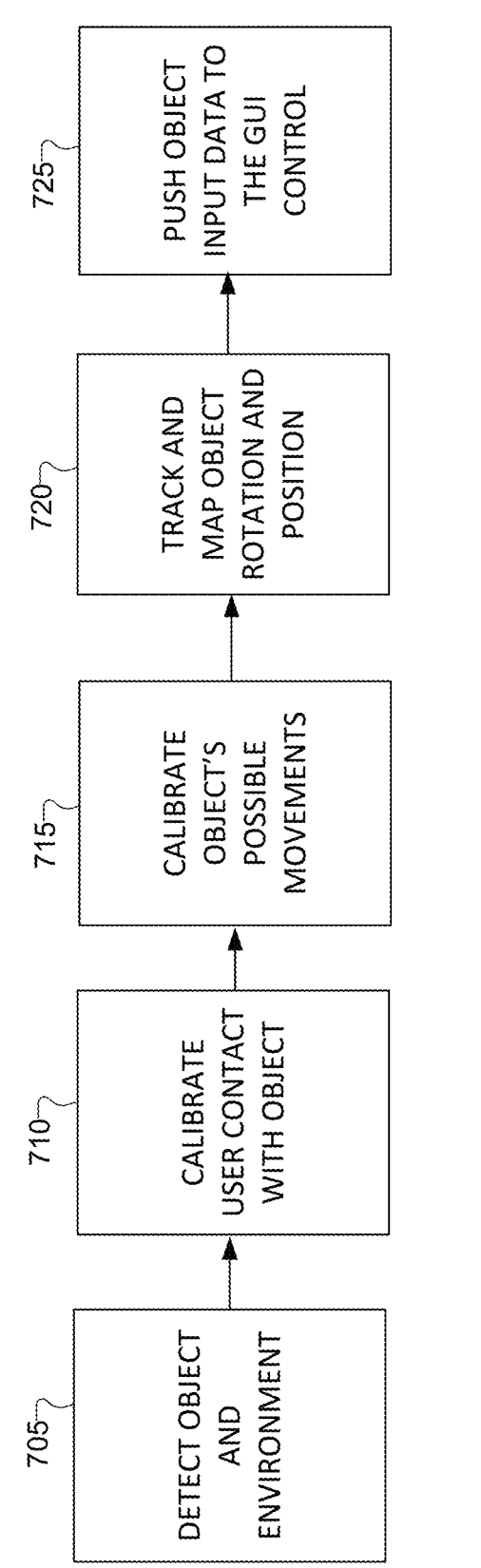
FIG. 7 illustrates an example process for using real world objects an input for widgets according to this disclosure.

FIG. 7 illustrates an example process 700 for using real world objects an input for widgets according to this disclosure. For ease of explanation, the process 700 is described as being implemented using one or more components of the network configuration 100 of FIG. 1 described above, such as the electronic device 101. However, this is merely one example, and the process 700 could be implemented using any other suitable device(s) (such as the server 106) and in any other suitable system(s).

As shown in FIG. 7, the process 700 includes an operation 705 in which the electronic device 101 detects an object and its environment using one or more external HMD cameras. Detecting the object and the environment allows the electronic device 101 to understand where the object is and how the object is positioned relative to the environment so the electronic device 101 can track changes over time and map those changes to a digital component.

Figure 8A:
FIGS. 8A through 8E illustrate details of an example detection operation in the process of FIG. 7 according to this disclosure.

FIGS. 8A through 8E illustrate details of an example detection operation 705 in the process 700 of FIG. 7 according to this disclosure. As shown in FIG. 8A, while the user wears an HMD, the user focuses on an object 805 that rests on a plane. An outward-facing camera associated with the HMD captures video of the surrounding environment, including the object 805 and the plane. The electronic device 101 receives the video in order to recognize which object the user is planning to map. The electronic device 101 can use eye tracking and mapping of the user's gaze onto the images in order to determine the object 805. The eye tracking and mapping can be based on another video received from an eye tracking camera associated with the HMD. In this example, the object 805 is a wallet. However, any suitable physical object can be used in the process 700.

Figure 8B:
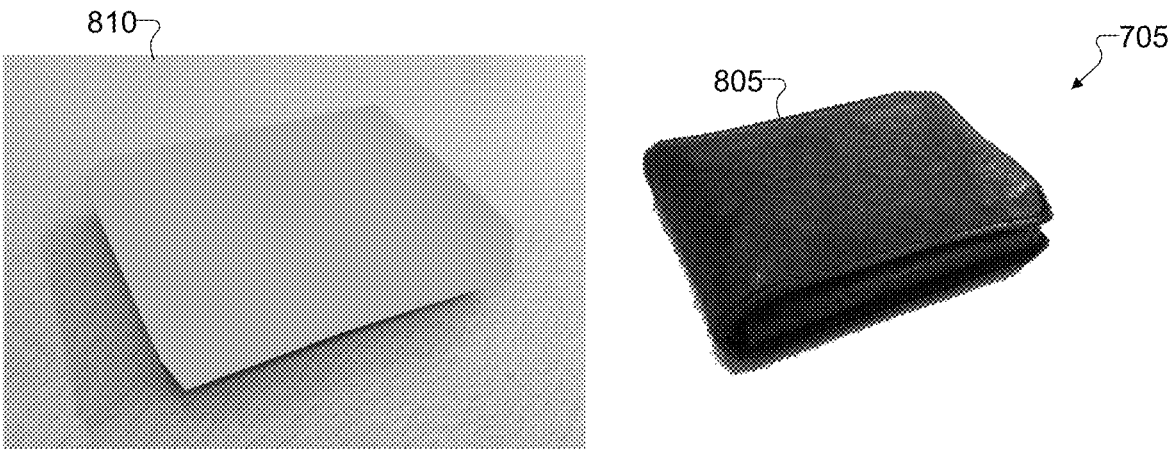
Figure 8C:
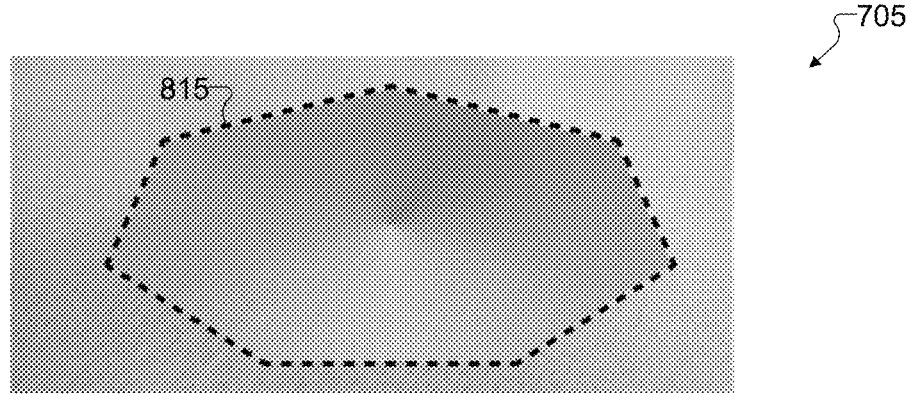

The electronic device 101 also detects the environment and recognizes the plane on which the object 805 is resting. For example, as shown in FIG. 8B, the electronic device 101 can use object segmentation to separate the focused object 805 from its environment 810, such as a desk on which the wallet sits. In object segmentation, the electronic device 101 can disregard the image area taken up by the focused object 805 and extrapolate missing image segments to help formulate the plane. From these new images that exclude the focused object 805, the electronic device 101 can feed video into a neural network that is trained to detect 3D planes in the user's physical environment. The detected resting plane 815 is simulated in the electronic device 101 as shown in FIG. 8C.

Figure 8D:
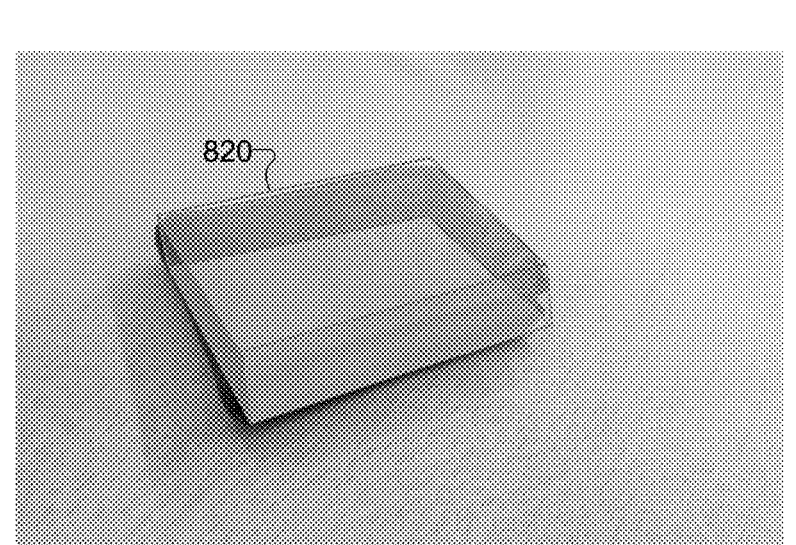
Figure 8E:
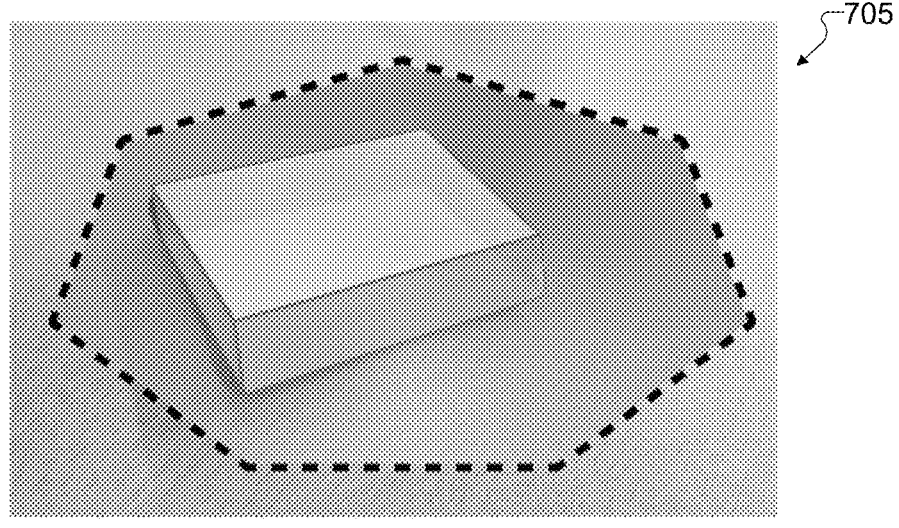

As shown in FIG. 8D, the electronic device 101 uses object recognition on the segmented focused object 805 to determine the general shape of the object 805. For example, a shape-detecting neural network may be trained on recognizing image shapes and in this case may assume a general shape 820 of the object 805 as a rectangular prism to represent the volume of the focused object 805. Other possible general shapes can include a sphere, a cylinder, a pyramid, or any other basic 3D object. By abstracting the actual shape of the object 805, this allows the electronic device 101 to better assume the input of the object 805. As shown in FIG. 8E, the electronic device 101 simulates the shape 820 onto the resting plane 815. This allows the electronic device 101 to connect how the shape 820 and the plane 815 are related to allow for object tracking. Now that the physical object's form is detected in its environment, the electronic device 101 can understand how to detect when the user is manipulating the object 805 and what the user intends to do with the object 805.

Figure 9A:
FIGS. 9A through 9C illustrate details of an example calibration operation in the process of FIG. 7 according to this disclosure.
Figure 9B:
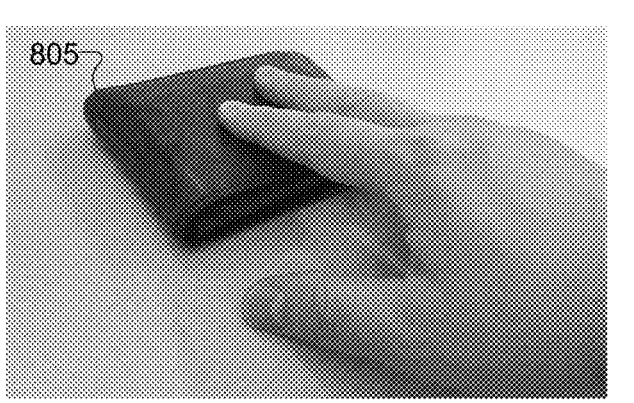
Figure 9C:
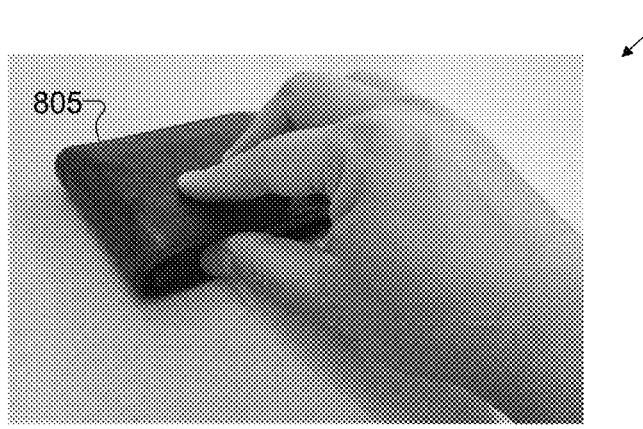

Turning again to FIG. 7, at an operation 710, the electronic device 101 calibrates the user making contact with the object 805. FIGS. 9A through 9C illustrate details of an example calibration operation 710 in the process 700 of FIG. 7 according to this disclosure. As shown in FIGS. 9A through 9C, the external camera(s) of the electronic device 101 can record multiple images 901-903 of the user touching or pinching the object 805 while the user views the object with the HMD. The recorded images 901-903 can be processed using computer vision to determine multiple aspects of the images 901-903, such as the shadow of the user's hand on the object 805 and the pose of the user's hand as the user's hand approaches the object 805. These help the electronic device 101 to understand whether the user is making no contact, approaching the object, grabbing or otherwise contacting the object, or releasing the object.

The electronic device 101 tracks how the area of the shadow projected on the object 805 is initially detected as the user's hand gets close to the object 805 and tracks the rate that the area of the shadow reduces as the user's hand occludes the object 805. When the occlusion reaches some threshold, the electronic device 101 can flag that occlusion has succeeded. The electronic device 101 can also use hand tracking to map the user's hand pose when touching the object. The electronic device 101 can record the change in hand gesture during the approach, grab/touching, and release of the object to help the electronic device 101 understand the user's intent. In some embodiments, the electronic device 101 has already been trained to recognize no contact. In the operation 710, the electronic device 101 learns the user's intent in approach and release. In order to map the user grabbing the object 805, the electronic device 101 can ask the user to confirm the moment that the user is grabbing the object 805, such as via the user clicking another UI button. This helps to ensure that the electronic device 101 understands when the object 805 is actually being contacted rather than just being nearby, which can be useful or important during tracking.

At an operation 715, the electronic device 101 calibrates the physical object's possible movements in space. In some embodiments, inputs using real-world objects can be grouped into three types of controls: contact, rotational, and positional. Contact mapping only requires that the user calibrate when the user makes contact with an object. If this is the only type of control desired by the user, the process 700 may only involve the calibration of the operation 710. However, if the user is interested in rotational or positional controls, the operation 715 can be performed for rotational and positional mapping.

Figure 10A:
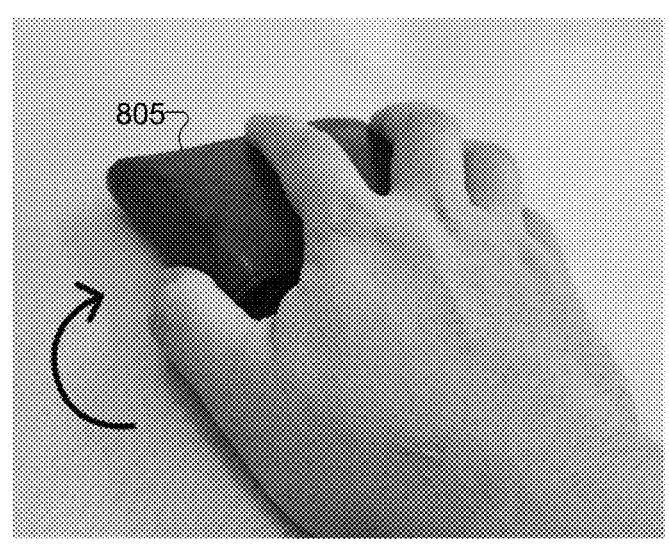
FIGS. 10A and 10B illustrate images showing details of an example calibration operation for rotational mapping in the process of FIG. 7 according to this disclosure.
Figure 10B:
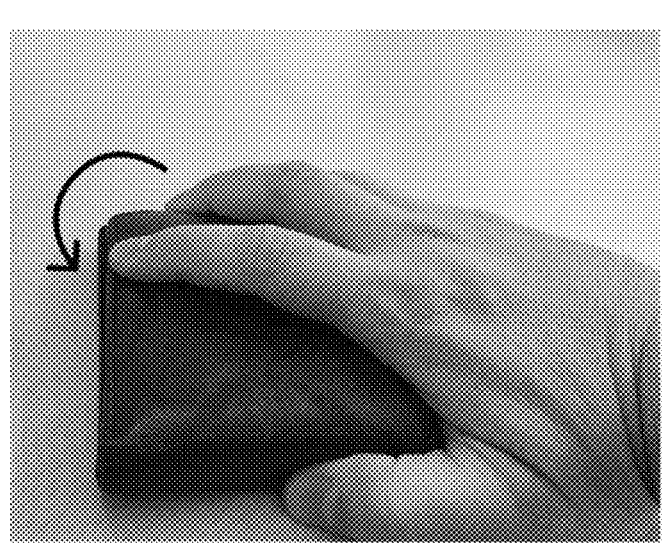

FIGS. 10A and 10B illustrate images 1001-1002 showing details of an example calibration operation 715 for rotational mapping in the process 700 of FIG. 7 according to this disclosure. For rotational mapping, the electronic device 101 can record the user rotating the object 805 along the same axis while the user makes contact with the object 805, such as shown in FIGS. 10A and 10B. Since the electronic device 101 is checking for a rotational movement, the user may rotate the object 805 from a minimum angle to a maximum angle (FIG. 10A) and back to the minimum angle (FIG. 10B) multiple times. At each maximum and minimum angle, the user can pinch a button to confirm to the electronic device 101 that the user has reached the maximum and minimum. While the object 805 rotates between these extreme positions, the electronic device 101 continues to record the object 805 and hand positions mapping them to certain key rotations. This allows the electronic device 101 to create interpolative poses to better map positions of the object 805 to digital input.

Figure 11A:
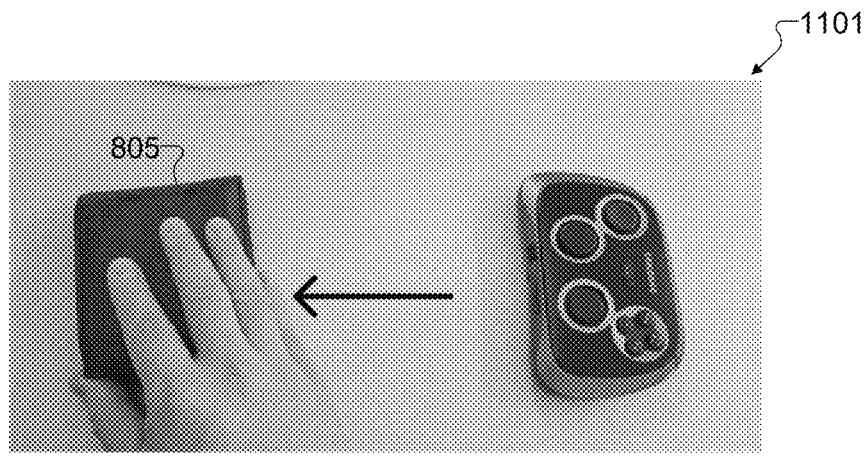
FIGS. 11A through 11C illustrate images showing details of an example calibration operation for positional mapping in the process of FIG. 7 according to this disclosure.
Figure 11B:
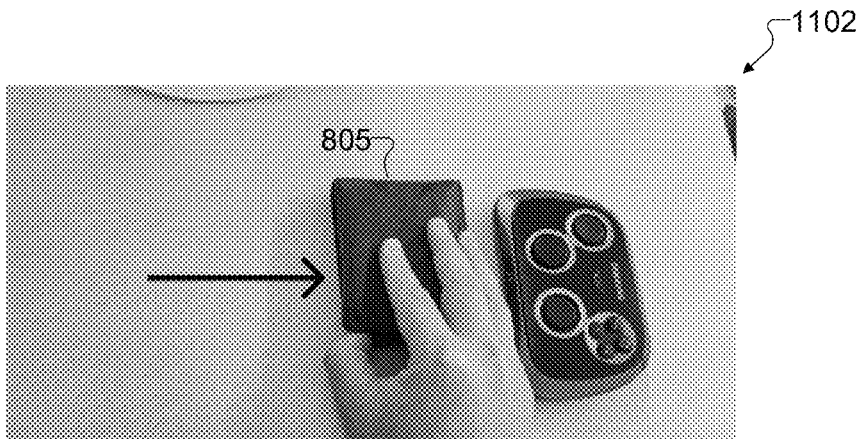
Figure 11C:
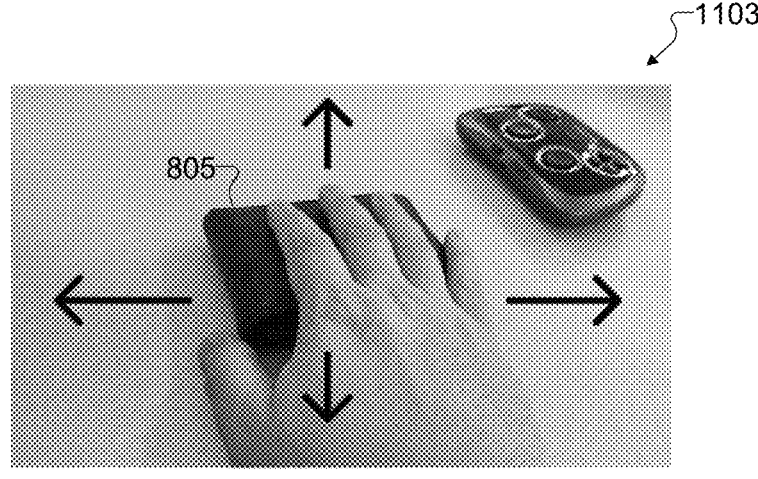

FIGS. 11A through 11C illustrate images 1101-1103 showing details of an example calibration operation 715 for positional mapping in the process 700 of FIG. 7 according to this disclosure. For positional mapping, the electronic device 101 records the user moving the object 805 along one axis of the surface (FIGS. 11A and 11B) or along multiple axes of the surface (FIG. 11C). While the user makes contact, the user can confirm (such as by using one or more virtual buttons) when the object 805 is at a minimum or maximum of each axis and state which axis physically maps to which digital axis. Again, by recording the object 805 and hand poses at the minimum and maximum for each axis and by generating key positions while the user moves the object 805 between extreme positions along the axes, the electronic device 101 can understand the possible positions of the object 805 and how the positions relate to the digital input.

Turning again to FIG. 7, now that contact and movement of the object 805 is calibrated within its environment, at an operation 720, the electronic device 101 tracks and maps the rotation and position of the object 805 in order to detect when the user performs a contact or movement action. Such an action can be interpreted as a digital input.

Figure 12A:
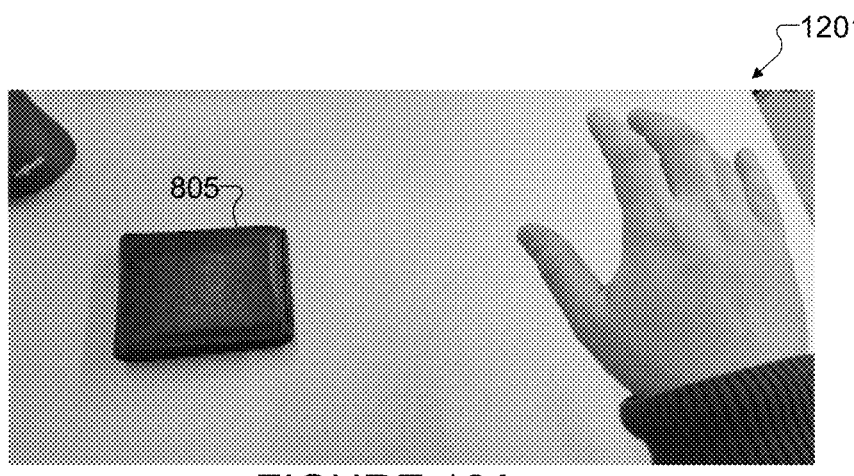
FIGS. 12A through 12C illustrate images showing details of an example tracking operation in the process of FIG. 7 according to this disclosure.
Figure 12B:
Figure 12C:
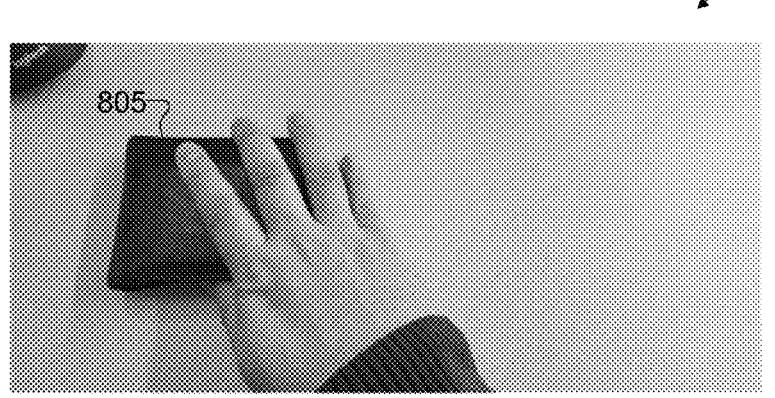

FIGS. 12A through 12C illustrate images 1201-1203 showing details of an example tracking operation 720 in the process 700 of FIG. 7 according to this disclosure. When the object 805 comes into view of the HMD external camera(s), the electronic device 101 starts tracking its position relative to the plane on which it rests, such as is shown in FIG. 12A. If the user's hand comes within a small distance of the object 805 (such as less than 10 cm as shown in FIG. 12B), the electronic device 101 starts sending the images to the neural network or other logic for processing the images in order to understand if the user is making contact with the object. If the user makes contact based on the calibration thresholds (such as is shown in FIG. 12C), the electronic device 101 can determine a digital input signal to send to a widget control or other control.

Likewise, if the object 805 is mapped for rotational or positional changes, the electronic device 101 begins tracking the object 805 while the user is making contact with the object 805 and sends segmented images to the neural network or other logic for processing. As the object 805 is moved around (such as the movements shown in FIGS. 10A and 10B and 11A through 11C), the electronic device 101 uses the calibration thresholds to interpret the movements of the object 805 within the defined minima and maxima. By interpolating the current position or rotation of the object 805 between the minima and maxima, the electronic device 101 can determine the digital input signal to send to a widget control or other control.

Now that the electronic device 101 has values for the digital input, at an operation 725, the electronic device 101 pushes the digital input, such as to a digital GUI control. For example, the electronic device 101 can determine which GUI control will receive digital input. In some embodiments, the electronic device 101 tracks the last GUI control that the user focused on or interacted with, or the electronic device 101 uses eye tracking to track the GUI control at which the user is currently gazing. By determining the intended GUI control, the electronic device 101 can send the input signal to the correct GUI control. In other embodiments, the electronic device 101 can directly map the object 805 to a specific UI control without considering user gaze. For instance, the electronic device 101 can ask the user to provide a physical volume control. After setting up the physical object 805 as described above, the electronic device 101 knows to control the volume regardless of whether the digital volume GUI is in view or last focused.

Once the GUI control receives the input signal from the electronic device 101, the GUI control determines how to interpret the value. For example, for contact-mapped controls, the input values can be "touching" or "not touching." In some embodiments, these values may apply only to controls that require Boolean inputs, such as button presses, radio buttons, checkboxes, and the like.

For rotational controls, the input can be a real number value between a minimum and maximum, such as between 0 and 1. Such values may apply to GUI controls that utilize an axis, such as a slider or scrollbar, where the user controls a number between a control-defined minimum and maximum. In some embodiments, the GUI control can be Boolean but could distinguish a threshold between 0 to 1 to interpret the input value.

For positional controls, the GUI controls can be Boolean or axis-based, similar to the previously-discussed rotational controls, as long as only one positional axis is being tracked. When two axes are being tracked, there can be two input values, such as one for each tracked axis. The GUI system can apply the two values to two single-axis controls or to a single GUI control that has two axes, such as a map or a vertical-and-horizontal scrollbar frame. This way, both input values can be utilized simultaneously.

Figure 13A:
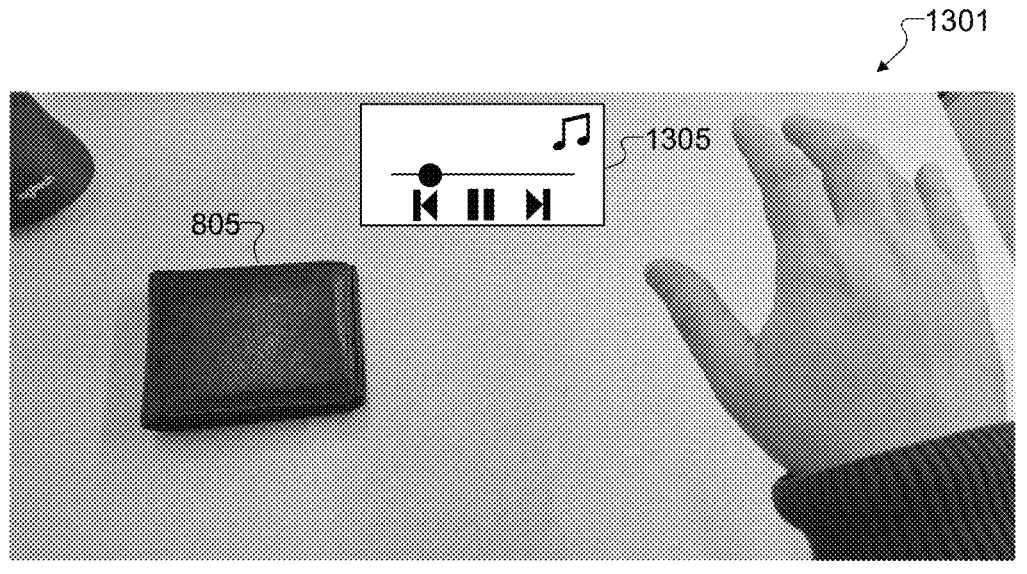
FIGS. 13A through 13D illustrate images showing examples of various operations in the process of FIG. 7 according to this disclosure.
Figure 13B:
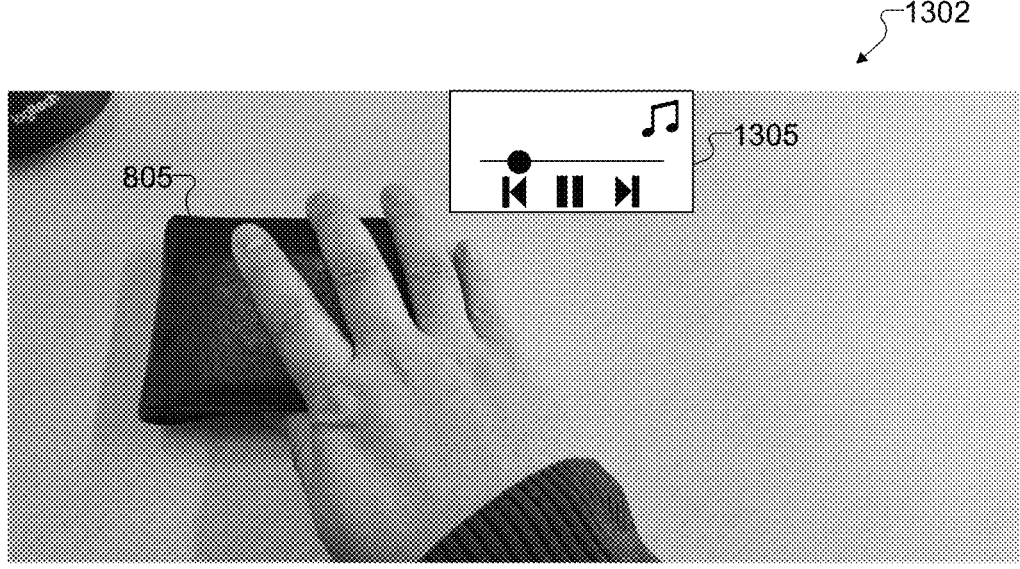

FIGS. 13A through 13D illustrate images 1301-1304 showing examples of various operations 720 and 725 in the process 700 of FIG. 7 according to this disclosure. As shown in FIG. 13A, an audio widget 1305 is currently playing, and the user's hand approaches the object 805 while the user's gaze is on the audio widget 1305. The electronic device 101 tracks the hand position as it approaches the object 805 and determines the hand has made contact with the object 805 as shown in FIG. 13B. Once this occurs, the electronic device 101 sends an input to the audio widget 1305, such as an input that toggles a play/pause button and pauses the audio.

Figure 13C:
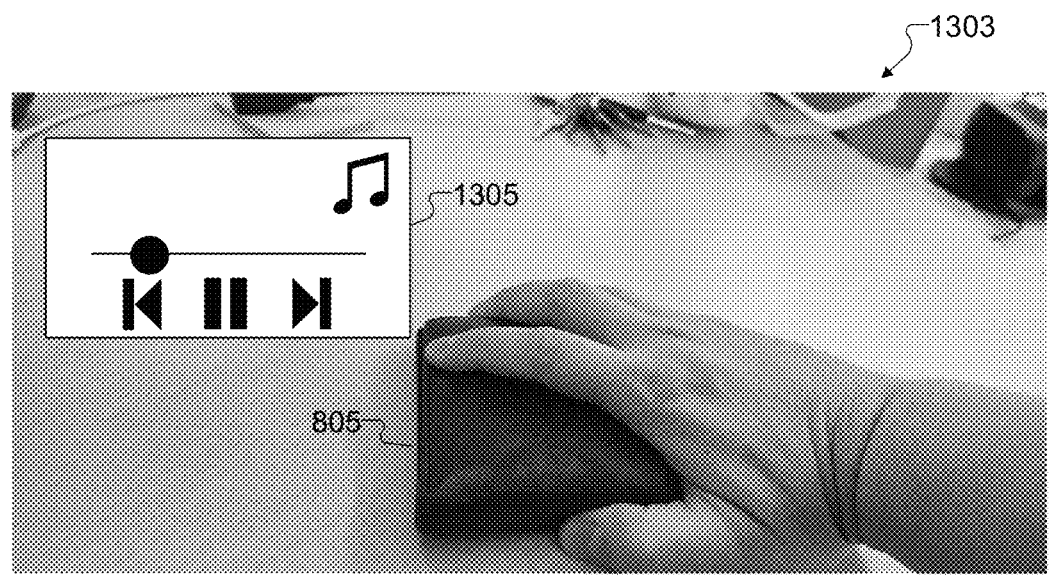

As shown in FIG. 13C, the audio widget 1305 is currently playing, and the user's gaze is currently on the audio widget 1305 while the user's hand grabs the object 805. As the user rotates the object 805, the electronic device 101 interpolates the rotation angle of the object 805 based on the calibrated minimum and maximum angles. The electronic device 101 sends an angle input to the audio widget 1305, which controls a slider amount and fast forwards the audio.

Although FIGS. 7 through 13D illustrate one example of a process 700 for using real world objects an input for widgets and related details, various changes may be made to FIGS. 7 through 13D. For example, while the process 700 is described as involving specific sequences of operations, various operations described with respect to FIGS. 7 through 13D could overlap, occur in parallel, occur in a different order, or occur any number of times (including zero times). Also, the specific operations shown in FIGS. 7 through 13D are examples only, and other techniques could be used to perform each of the operations shown in FIGS. 7 through 13D.

Gaze With Gestures/Controllers/Physical Objects on Widgets

As discussed above, users may use hand gestures, controllers, and physical objects to control widget input. In some embodiments, if a system includes eye tracking, the user may also incorporate gaze to control which widget or widget control that the user is interfacing with.

In some embodiments, the user's gaze can remove the need for a cursor directed from the hand or controller angles. For example, when a user interacts with a widget component, the user gaze can be directed at the widget component, which determines that the user intends to interact with the widget component. The user can initiate interaction by pinching using a hand gesture or by pressing a controller trigger. Because the electronic device 101 detects the direction of the user's gaze, neither the user's hand nor the controller needs to aim towards the desired component. The electronic device 101 can still detect short and long presses, which can trigger the widget control for bringing up the widget system menu and interacting with widget components.

When the user moves an object 805, the electronic device 101 can detect rotation of the hand or controller pose rather than DMM. An angular amount can be defined such that when the hand or controller pose rotates beyond that amount, it triggers the beginning of widget movement. The widget can move based on a combination of gaze, for large distant movements, and angular movement for slight changes. Dragging can also be used for scrolling input as well. When a user is utilizing a physical object 805 and gaze, the electronic device 101 can register which widget the user has last gazed on or interacted with, and the physical object tracking can apply accordingly.

Voice Controlled Widgets

In some embodiments, users can use their voice to interact with widgets, such as by speaking voice commands. The electronic device 101 can understand from the voice command which widget the user wants to interact with. For example, if the user ends a voice command by speaking the widget name (such as "<Action> on Gallery Widget" or "<Action> on Calendar Widget"), the electronic device 101 knows to perform the action on the identified widget. However, if the user does not include a widget name in a voice command, the electronic device 101 can rely on the user's gaze or the last widget the user interacted with or gazed upon to identify the widget that is the focus of the action. The voice command action may require the use of a widget component label to perform the action. For example, if the widget has a volume slider, the user may command "Set Volume to half on Music Widget."

In some embodiments, the electronic device 101 can send the voice command to a network server or use machine learning to understand the voice command. For example, the user may speak a voice command "Set Party on February 4th," where the user was last looking at the calendar widget. Running the audio through a voice AI network, the electronic device 101 can receive the text command and send to the widget a command to set a party event on February 4. If the widget's application also supports voice commands such as "Music play <Artist>," the user can use those voice commands, and the widget can route the command to the appropriate application and let the application perform the action. The voice commands can also include updating actions to the widget, such as "Update the widget content and start playing the music."

Figure 14:
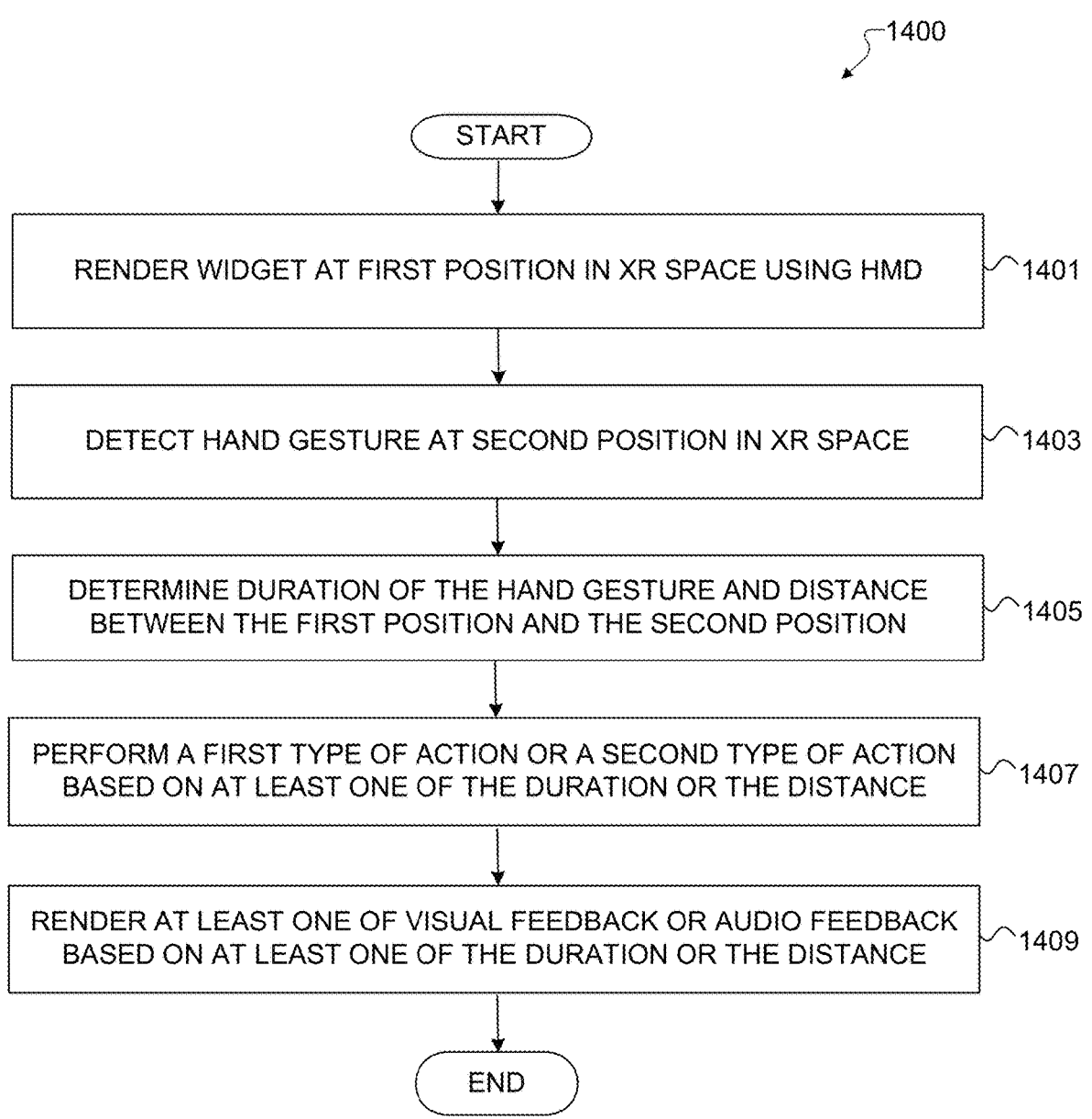
FIG. 14 illustrates an example method for interacting with a widget according to this disclosure.

FIG. 14 illustrates an example method 1400 for interacting with a widget according to this disclosure. For ease of explanation, the method 1400 shown in FIG. 14 is described as being performed using the electronic device 101 shown in FIG. 1 and the widget controls shown in FIGS. 2A through 6B. However, the method 1400 shown in FIG. 14 could be used with any other suitable device(s) or system(s) and could be used to perform any other suitable process(es).

As shown in FIG. 14, at step 1401, a virtual widget is rendered at a first position in an XR space using an HMD. This could include, for example, the electronic device 101 rendering the widget 305 in an XR space, such as is shown in FIG. 3A. At step 1403, a hand gesture of a user is detected at a second position in the XR space using at least one optical sensor of the HMD. The second position is between the first position and the at least one optical sensor. This could include, for example, the electronic device 101 detecting a pinch and hold or other gesture by a user, such as is shown in FIGS. 3A through 3C. At step 1405, a duration of the hand gesture and a distance between the first position and the second position are determined. This could include, for example, the electronic device 101 determining the duration of the pinch and hold or other gesture and the location of the cursor, such as is shown in FIGS. 3A through 3C.

At step 1407, a first type of action or a second type of action is performed based on at least one of the duration or the distance. The first type of action corresponds to a system-level control of the virtual widget and the second type of action corresponds to a content-level control of the virtual widget. This could include, for example, the electronic device 101 performing a system-level control of the widget 305, such as is shown in FIGS. 3A through 3C, or a content-level control of the widget 305, such as shown in FIGS. 5A through 5C. At step 1409, at least one of a visual feedback or an audio feedback is rendered based on at least one of the duration or the distance. This could include, for example, the electronic device 101 scrolling text in a note widget 512 or playing music in a music player widget 511, such as is shown in FIGS. 5A through 5C.

Although FIG. 14 illustrates one example of a method 1400 for interacting with a widget, various changes may be made to FIG. 14. For example, while shown as a series of steps, various steps in FIG. 14 could overlap, occur in parallel, occur in a different order, or occur any number of times (including zero times).

FIG. 15 illustrates an example method 1500 for controlling a widget using a real world object according to this disclosure. For ease of explanation, the method 1500 shown in FIG. 15 is described as being performed using the electronic device 101 shown in FIG. 1 and the process 700 shown in FIG. 7. However, the method 1500 shown in FIG. 15 could be used with any other suitable device(s) or system(s) and could be used to perform any other suitable process(es).

As shown in FIG. 15, at step 1501, a first video is received that was captured using an outward facing camera associated with an HMD worn by a user. The first video captures a user environment. This could include, for example, the electronic device 101 receiving a video of the object 805, such as by performing the operation 720. At step 1503, a second video is received that was captured using an eye tracking camera associated with the HMD. This could include, for example, the electronic device 101 receiving video of the user's gaze, such as by performing the operation 720. At step 1505, a real world object is identified on which eyes of the user are focused based on the second video. The real world object is associated with a set of control options. This could include, for example, the electronic device 101 identifying the object 805, such as is shown in FIG. 12A.

Figure 13D:
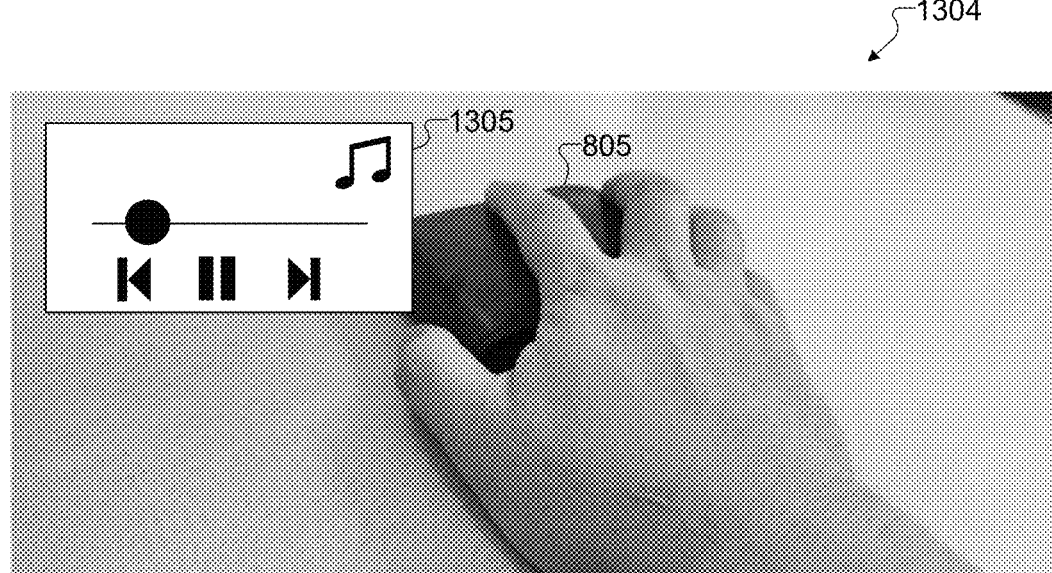

At step 1507, a type of interaction that the user makes with the real world object is determined based on the first video. The type of interaction comprises a contact interaction, a rotation interaction, or a shift interaction. This could include, for example, the electronic device 101 determining whether the type of interaction with the object 805 is a contact interaction (such as is shown in FIG. 12C), a rotation interaction (such as shown in FIGS. 13C and 13D), or a shift interaction (such as shown in FIGS. 11A through 11C).

At step 1509, a control option is selected among the set of control options based on the determined type of interaction. This could include, for example, the electronic device 101 selecting an audio widget 1305, such as is shown in FIGS. 13A through 13D. At step 1511, a virtual widget in an XR space is controlled based on the selected control option. This could include, for example, the electronic device 101 controlling the audio widget 1305, such as is shown in FIGS. 13C and 13D.

Although FIG. 15 illustrates one example of a method 1500 for controlling a widget using a real world object, various changes may be made to FIG. 15. For example, while shown as a series of steps, various steps in FIG. 15 could overlap, occur in parallel, occur in a different order, or occur any number of times (including zero times).

The disclosed embodiments are suitable for a wide variety of use cases. For instance, the disclosed embodiments enable any suitable consumer XR system to interact with a variety of widgets, such as photo widgets, calendar widgets, scheduling widgets, map widgets, audio player widgets, note widgets, and the like. The widget control solutions disclosed herein can be used in various types of XR experiences, including working, socializing, or gaming. The disclosed embodiments allow the user to interact with the widgets using one or more real world objects, such as a wallet, an earbuds case, or any other suitable physical object.

Note that the operations and functions shown in or described with respect to FIGS. 2A through 15 can be implemented in an electronic device 101, 102, 104, server 106, or other device(s) in any suitable manner. For example, in some embodiments, the operations and functions shown in or described with respect to FIGS. 2A through 15 can be implemented or supported using one or more software applications or other software instructions that are executed by the processor 120 of the electronic device 101, 102, 104, server 106, or other device(s). In other embodiments, at least some of the operations and functions shown in or described with respect to FIGS. 2A through 15 can be implemented or supported using dedicated hardware components. In general, the operations and functions shown in or described with respect to FIGS. 2A through 15 can be performed using any suitable hardware or any suitable combination of hardware and software/firmware instructions.

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   rendering a virtual widget at a first position in an extended reality (XR) space using a head-mounted display (HMD);
   detecting a hand gesture of a user at a second position in the XR space using at least one optical sensor of the HMD, wherein the second position is between the first position and the at least one optical sensor;

determining a duration of the hand gesture and a distance between the first position and the second position;

performing a first type of action or a second type of action based on at least one of the duration or the distance, wherein the first type of action corresponds to a system-level control of the virtual widget and the second type of action corresponds to a content-level control of the virtual widget, and wherein a content hit target is marked to disable widget system level hits when the second type of action is performed; and rendering at least one of a visual feedback or an audio feedback based on at least one of the duration or the distance.

2. The method of claim 1, wherein the first type of action comprises at least one of: invoking a widget menu, moving the virtual widget, placing the virtual widget at a location, or invoking resizing handles.

3. The method of claim 1, wherein the second type of action comprises at least one of: selecting a button on the virtual widget, navigating or scrolling a content on the virtual widget, or invoking widget expansion for additional interactions with the virtual widget.

4. The method of claim 1, wherein rendering the visual feedback comprises rendering a raycast between the first position and the second position based on the distance.

5. The method of claim 1, wherein the hand gesture includes at least one of: a pinch gesture, a poke gesture, a pinch-and-drag gesture, a pinch-and-hold gesture, or a hover gesture.

6. The method of claim 1, further comprising:

detecting a second hand gesture of the user in the XR space, the second hand gesture associated with a physical object; and performing a third type of action or rendering at least one of the visual feedback or the audio feedback based on the second hand gesture.

7. The method of claim 1, further comprising:

detecting a voice command from the user; and performing the first type of action or the second type of action based on the voice command.

8. An electronic device comprising:

a head-mounted display (HMD) configured to render a virtual widget at a first position in an extended reality (XR) space; and at least one processing device configured to:

receive a hand gesture of a user at a second position in the XR space detected using at least one optical sensor of the HMD, wherein the second position is between the first position and the at least one optical sensor;

determine a duration of the hand gesture and a distance between the first position and the second position;

perform a first type of action or a second type of action based on at least one of the duration or the distance, wherein the first type of action corresponds to a system-level control of the virtual widget and the second type of action corresponds to a content-level control of the virtual widget, and wherein a content hit target is marked to disable widget system level hits when the second type of action is performed; and render at least one of a visual feedback or an audio feedback based on at least one of the duration or the distance.

9. The electronic device of claim 8, wherein:

the first type of action comprises at least one of: invoking a widget menu, moving the virtual widget, placing the virtual widget at a location, or invoking resizing handles; and the second type of action comprises at least one of: selecting a button on the virtual widget, navigating or scrolling a content on the virtual widget, or invoking widget expansion for additional interactions with the virtual widget.

10. The electronic device of claim 8, wherein, to render the visual feedback, the at least one processing device is configured to render a raycast between the first position and the second position based on the distance.

11. The electronic device of claim 8, wherein the hand gesture includes at least one of: a pinch gesture, a poke gesture, a pinch-and-drag gesture, a pinch-and-hold gesture, or a hover gesture.

12. The electronic device of claim 8, wherein the at least one processing device is further configured to:

receive a second hand gesture of the user detected in the XR space, the second hand gesture associated with a physical object; and perform a third type of action or render at least one of the visual feedback or the audio feedback based on the second hand gesture.

13. The electronic device of claim 8, wherein the at least one processing device is further configured to:

receive a voice command from the user; and perform the first type of action or the second type of action based on the voice command.

14. A method comprising:

receiving a first video captured using an outward facing camera associated with a head-mounted display (HMD) worn by a user, the first video capturing a user environment;

receiving a second video captured using an eye tracking camera associated with the HMD;

identifying a real world object on which eyes of the user are focused based on the second video, wherein the real world object is associated with a set of control options;

calibrating the real world object and user contact with the real world object to map and interpret one or more movements of the real world object and the user contact to control one or more widgets based on one or more calibration thresholds;

determining a gaze of the user based on the second video;

registering a widget last gazed on by the user;

determining a type of interaction the user makes with the real world object during the user contact based on the first video, the type of interaction comprising one of a contact interaction, a rotation interaction, or a shift interaction;

selecting a control option among the set of control options based on the determined type of interaction;

selecting a virtual widget based on the gaze of the user and the registered widget; and controlling the virtual widget in an extended reality (XR) space based on the selected control option and the one or more calibration thresholds.

15. The method of claim 14, wherein the contact interaction is associated with a Boolean control of the virtual widget, the Boolean control having two states.

16. The method of claim 14, wherein:

the rotation interaction is associated with a continuous control of the virtual widget between a minimum value and a maximum value; and a change in angle caused by the rotation interaction is mapped to a value of the virtual widget between the minimum value and the maximum value.

17. The method of claim 14, wherein:

the shift interaction is associated with a continuous control of the virtual widget between a minimum value and a maximum value; and a change in position caused by the shift interaction is mapped to a value of the virtual widget between the minimum value and the maximum value.

18. The method of claim 17, wherein:

the change in position represents a change along a first axis and a second axis;

the change along the first axis is used to control a first feature of the virtual widget; and the change along the second axis is used to control a second feature of the virtual widget.

19. The method of claim 14, further comprising:

detecting one or more voice commands from the user; and controlling the virtual widget based on the one or more voice commands.

20. The method of claim 1, wherein the second type of action comprises invoking widget expansion for additional interactions with the virtual widget and the expanded virtual widget does not invoke the system-level control.

\* \* \* \* \*